(12) United States Patent
Marek

(10) Patent No.: US 6,854,902 B2
(45) Date of Patent: Feb. 15, 2005

(54) FLASH BRACKET WITH SHUTTER-SYNCHRONIZED SPOTLIGHT

(75) Inventor: Christopher John Marek, 1110 Britain Rd. South, Irving, TX (US) 75060

(73) Assignee: Christopher John Marek, Irving, TX (US)

(*) Notice: Subject to any disclaimer, the term of this patent is extended or adjusted under 35 U.S.C. 154(b) by 0 days.

(21) Appl. No.: 10/281,369

(22) Filed: Oct. 28, 2002

(65) Prior Publication Data
US 2004/0081455 A1 Apr. 29, 2004

(51) Int. Cl.[7] .......................... G03B 17/00; G03B 11/00
(52) U.S. Cl. ...................................... 396/425; 396/544
(58) Field of Search .......................... 396/544, 419, 396/421, 422, 424, 425, 427, 428, 25, 28, 29, 158, 182; 352/147, 199

(56) References Cited

U.S. PATENT DOCUMENTS

| | | | |
|---|---|---|---|
| 2,682,816 A | * 7/1954 | Walden | .................. 396/71 |
| 4,067,030 A | 1/1978 | Kuramoto | |
| 4,777,501 A | * 10/1988 | Caimi et al. | .................. 396/28 |
| 5,142,299 A | 8/1992 | Braun | |
| 5,752,097 A | * 5/1998 | McIntyre | .................. 396/157 |
| 6,512,887 B2 | * 1/2003 | Inoue et al. | .................. 396/28 |

OTHER PUBLICATIONS

Rain Forest at Night, Tim Laman, Oct. 2001, p. 130 National Geographic vol. 200 No. 4.

* cited by examiner

Primary Examiner—Judy Nguyen
Assistant Examiner—Rochelle Blackman

(57) ABSTRACT

A portable lighting system for performing photography in poor light situations. The lighting system is composed of a rigid frame consisting of a base portion (124A) for mounting a camera (36) and a raised portion (124B) that uses a ball-joint (79) and a rigid arm (120) to support a spotlight (121) and a flash unit (122). A controlling device (31) for the spotlight is positioned above a pistol grip (91) on the raised portion (124B). The controlling device is activated by a trigger (20) and can be adjusted to synchronize the lighting system with the camera shutter so that the lighting system can not interfere or adversely effect the photographic results.

21 Claims, 28 Drawing Sheets

FLASH BRACKET WITH SHUTTER-SYNCHRONIZED SPOTLIGHT

BACKGROUND

1. Field of Invention

This invention relates to photographic equipment, specifically to a Flash Bracket with a Shutter-Synchronized Spotlight for the purpose of facilitating photography under poor lighting conditions.

2. Description of Prior Art

Throughout this text, the term flashlight refers to the portable, normally handheld spotlight used by persons at night. The term, flash or flash unit, refers to an electric lamp, most often used for producing a high-intensity light of very short duration for use in photography.

Flash brackets of various sizes and shapes are well known in the art. A flash bracket is typically a framework of some sort that connects a camera body with a flash unit. This allows the flash unit to be supported off camera, so that the flash may be aimed more precisely at a subject. This is especially important with close-up photography. Thus flash brackets serve as a third hand for holding the flash unit. This configuration is popular with nature photographers because of its portability. Most flash brackets on the market today, are designed without any provision for a spotlight. The manufacturers of flash brackets assume that the photographer will be working with enough ambient light to render the subject in the camera viewfinder in focus. This assumption falls short of reality for many photographers involved in the pursuit of nature photography. The vast majority of wildlife is active at night, or confined to the shadows, where a photographer is required to use a flash unit in order to photograph them. For a photographer to work under these low light circumstances, a spotlight is necessary to illuminate a subject so that a pleasing, focused composition can be achieved. To this end, many nature photographers need an assistant equipped with a flashlight to help illuminate a subject in preparation for making the photograph. Some photographers find various means of attaching small flashlights to their flash units, or to some point on their flash bracket so that a subject can be illuminated for viewing through the camera viewfinder. Some photographers try using a headlamp as a spotlight. These solutions still have significant problems:

a) When a headlamp is used for a spotlight, the headlamp is difficult to get pointed at the subject while the photographer is peering through the viewfinder. This is especially so because the flash unit tends to be in the way of where the spotlight needs to be pointing. Even worse, night flying insects are attracted to the light, which is mounted directly on the users forehead.

b) Only small, AA type flashlights are practical for attaching to a flash bracket for purposes of having a spotlight to be used to aid focusing. However, the light from this source is weak and limited in range. A standard D size 3-cell flashlight provides ample light, but is too much bulk to attach to a flash bracket, and severely reduces the portability of the setup.

c) In both cases, A and B, the light must be turned on in anticipation of making a photograph, and remain on until the photographic session is over. This is because most photo opportunities are extremely fleeting, and the time it takes to remove ones eye from the viewfinder to turn on the spotlight, and then to return ones eye back to the viewfinder to make the shot is not practical.

d) In many cases the photographer is trying to photograph subjects that shun bright light, thus having such a constant light trained on the subject will generally elicit a lack of cooperation from the subject and may adversely prolong the photographic session.

e) Most nature photographers must endure long periods of waiting for their subjects to cooperate before a photograph can be made. This often means that the spotlight will be on, hence using up precious battery power, hence weakening the strength of the light (already a problem for the small flashlight) before any photography is done.

f) As mentioned, an assistant can be used to provide the service of spotlighting the subject with a standard size flashlight, thereby freeing the photographer of this chore. There are several problems with this arrangement. Nature photography requires a huge amount of concentration and patience. Generally, the person doing the spotlight duty does not feel as committed to the situation as the photographer. The photographer feels hurried by having a second person involved, and the necessary concentration and patience are lost. It is much better for the photographer to be able to work independently.

g) In addition to the problems of using an assistant, the use of a standard flashlight provides ample light, which then becomes a liability. The light from a standard D size 3-cell flashlight with fresh batteries is bright enough to make an exposure contribution to the final image in the photograph. This results in an effect known as "ghosting". This is because at the slow shutter speeds required to synchronize flash, a bright spotlight is too close to daylight exposure so you end up with a ghost image from the spotlight and another sharper image from the flash. So whereas a weak spotlight is aggravating to use, it will not make a contribution to the exposure of the image, thus avoiding the ghost image. The flash unit with its bright, short duration, will be the only significant light source, and will result in a sharp image. In contrast, a bright spotlight is comfortable to use, but it contributes to some of the exposure of the image and will cause the ghosting effect. As a result of all this, photographers end up favoring the small, weaker penlights to help them focus, while enduring the barely adequate light, and limited range they provide. My invention provides a way to use a comfortably bright focusing light without the ghosting effect.

Additional Explanation of the Problem Known as "Ghosting"

A photographic image is created when light passes through a lens and casts the resulting image (focused light) onto film. Film acts like a light collector. The length of time it takes to expose the film to make a successful photograph will depend on how strong the light is. An analogy for the photographic process is one where a cup is being filled with water. The goal is to fill the cup with only the amount of water it takes to fill it. No more or less will do. If the water comes out of a faucet as a trickle, the period of time to fill the cup will be longer than if the faucet is on all the way. The same is true of the way film collects light. If the available light is dim, the period of time to make the exposure will be longer than if the light comes as one big, bright, pulse. Either way, enough water is collected to result in a filled cup, and enough light is collected to result in a photograph.

If a photographer is working in a poorly lit room, the situation will require a slower shutter speed to get enough light to collect onto the film to make an image. For the sake of this explanation, lets say the camera shutter needs to be open for two full minutes in the poorly lit room of our example, to allow the film to be properly exposed. To make our photograph, we must open the camera shutter, and wait out the 120 seconds it takes to gather enough light from the subject being photographed to get an image on film. If the subject remains still throughout the exposure, the result will be a sharp picture of our subject. Now lets say we want to make a second photograph, using a different technique. For the sake of this explanation, lets say that we have available a flash unit that is capable of providing in one short pulse, the same amount of light that would otherwise take two minutes to collect from the poorly lit room to make the image. This means, if we want to make a photograph in our poorly lit room, we can just open the camera shutter, fire the flash unit, and then immediately close the camera shutter. In this way, using a flash, we will have supplied the necessary amount of light (plus a negligible amount of light from the room as we manually open and then close the shutter) to make the photograph. Assuming that we were able to open the shutter, fire the flash unit and close the shutter in just one second, for all practical purposes, the flash unit will have provided the only significant source of light. (Only $\frac{1}{120}$ of the room light got in). Indeed, flash units provide a bright light source at an amazingly short duration, so the image exposed in this way is effectively rendered onto the film in a millisecond! Even if the subject is moving, no significant image movement will be recorded because of the short duration of the flash and essentially no exposure will come from the light in the room since we still need 119 more seconds to make an image in that way. Such techniques have been used to photograph a bullet fired from a rifle. The resulting photograph shows a bullet that appears suspended in the air! Now lets make another photograph in our poorly lit room, but this time we don't close the shutter after the flash is fired. Instead, we finish out the 120 second exposure and then close the shutter. In this case we will end up with a double image. We will end up with the sharper image that was produced by the flash and a blurred image (if the subject is moving) from the remainder of the 120 second exposure. The second blurry image often looks like a ghost, hence the term "ghosting" is applied to this result. If the subject is a stationary one, the result will be an overexposure of the subject. Ghosting and overexposure are some of the problems my invention solves. If a flashlight with fresh batteries is being used to provide light to aid in focusing on a subject, the light can be bright enough to cause the ghosting or overexposure effect over the flash unit exposure, exactly as explained earlier. Many older cameras require a modest shutter speed, of $\frac{1}{60}$ second, in order to get the flash to fire while the shutter is still open (this is called the flash sync shutter speed of the camera). So even though the flash has done its job in milliseconds, the flash sync shutter speed of the camera is slow and enough light, from say a bright flashlight, may be allowed to collect on the film to cause unwanted additional exposure, long (relatively speaking) after the flash exposure has occurred.

Description of Prior Art References

Inventors have sought to create an apparatus which facilitates the focusing of a camera under conditions of darkness or poor light. U.S. Pat. No. 4,067,030 to Kuramoto (1978) shows a spotlight focusing aid that may be built directly into a camera, or built into a flash unit. Kuramoto attempts to solve the problem of ghosting by several means. Regarding flash units, Kuramoto has designed one embodiment wherein the spotlight will turn off automatically in response to the discharge of the flash's capacitor. However, I learned from my experiences testing my own invention that if a spotlight is being used that provides as bright a light as the spotlight of my invention, it would be impossible for the filament of the light bulb to cool down fast enough to be no longer emitting light during the shutter release sequence. Indeed, it would be as if the light was never shut off at all. Most cameras during the period of Kuramoto's patent had a top shutter sync speed of $\frac{1}{60}$ of a second. Kuramoto admits in his specification that the spotlight will still be on at the start of the shutter release sequence of his invention. This means that the bulb filament has to go cold in much less than $\frac{1}{60}$ of a second for Kuramoto to have succeeded in his design. Kuramoto's design works because he is using a relatively dim spotlight. This would be necessary because a stronger light would not be able to shut off quickly as explained. A stronger light would also compete with the capacitor of the flash unit for power thus slowing the recycle time for the flash unit. This would be an unacceptable compromise for most photographers. To conserve power, and solve the problem of filament cool down, Kuramoto has developed a novel approach to the manner in which his spotlight works. Rather than illuminating the whole of a photographic subject, Kuramoto's invention conserves power by reducing the spotlight output to a small circle of light, which can then be placed upon a very limited portion of the subject to be photographed. Then, using the split-image focusing aid that was common to many cameras of that time, the out-of-focus circle of light would be seen as two distinct circles of light. To achieve focus, these are brought into registration with each other by rotating the focusing ring of the picture-taking lens. There are many problems with this arrangement. The subject of the photograph would be essentially impossible to evaluate for compositional appeal since the method just described only provides a way to focus by using an indirect means that fails to illuminate the entire scene. Furthermore, since 1986, most camera manufacturers have abandoned the split image focusing aids because in reality they were annoying to use. Today, the preferred focusing screens have grid lines or other etchings that the photographer can easily look past to see a subject for the purpose of focusing. In the Nikon system, these screens are called "E" screens. Canon calls them "D" screens. The focusing aid of the split focus type screens were impossible to look past for purposes of focusing the subject directly. In any case, there are many subjects that would be difficult to hit with the small circle of light of Kuramoto's invention. For instance, a popular nature image such as a dew-covered spider web would be a difficult subject using the aforementioned technique. This is because the subject is translucent. However, Kuramoto's invention would be unsuitable for all close-up photography. One of the laws of optics is that as magnification increases, depth of field dramatically decreases. Therefore, only being able to see and focus on a small portion of a close-up subject will guarantee a bad result. The spider web example is a photographic subject that falls into a narrow plane. To have the entire subject in focus, it is necessary to carefully line up the camera's film plane so that it is parallel to that of the subject plane. This can not be done if only a part of the subject is being illuminated. Depth of field is so limited that there is not much leeway for error. To determine focus and composition, it is necessary for the entire subject, especially in close-up photography, to be illuminated to make the proper judgments. Kuramoto discusses other embodiments wherein the spotlight is built into a camera body. But these suffer the same drawbacks as already mentioned and may have additional drawbacks. For instance, Kuramoto explains that the spotlight may be automatically angularly adjusted by the camera focusing mechanism in accordance with the object distance to compensate for parallax. However, this approach would commit the picture taking lens to a link mechanism of some sort that would likely obviate interchangeable lenses for this type of camera. Interchangeable lenses are the main benefit of 35 mm cameras, which are the preferred choice of nature photographers. U.S. Pat. No. 5,142,299 to Braun; Bradley S. (1992) shows a focusing system that comprises two spotlights that intersect at a predetermined point of focus. Thus the placement of a photographic subject at this intersection point allows the photographer to work without even looking through the camera viewfinder. This technique is adequate for the demanding conditions of underwater photography that is the primary use of the invention of Braun and Bradley. However, outside the aquatic environment, the invention of Braun and Bradley is susceptible to many of the problems, A through G, already listed earlier in this discussion of prior art. The October 2001 issue of National Geographic, pp. 130, shows a photograph of a photographer at work using a penlight spotlight as a focusing aid. This photograph helps to demonstrate that photographers are currently still enduring the problems I have described and that my invention solves.

Objects and Advantages

The objects and advantages of the present invention are:
a) To provide a spotlight that is easy to point towards the subject to be photographed;
b) To provide a spotlight that is bright as a 3 D-cell standard flashlight, yet is lightweight and will not reduce the portability of the bracket setup;
c) To provide a spotlight that is powered by connecting the spotlight to a remote battery pack, thus eliminating the bulk load at the spotlight position, and isolating any corrosion damage from battery leakage off of the spotlight assembly;
d) To have a spotlight system with greater range so that the bracket setup is not limited to close-up photography;
e) To provide a spotlight that will produce light immediately on demand rather than continuously;
f) To provide a spotlight that will not unduly disturb the subject to be photographed;
g) To provide a spotlight that conserves battery power;
h) To provide a spotlight system that will work with any camera, old or new, that uses a remote push-button means such as a standard cable release or electronic cable release;
i) To provide a spotlight that allows the photographer to work without the collaboration of another individual;
j) To provide a spotlight that will not cause a "ghosting" effect to be produced in the resulting image; and
k) To provide a spotlight that employs a very simple and reliable switching mechanism that is easy to manufacture.

Further objects and advantages are to provide a spotlighting system that is simple to use and inexpensive to manufacture. The present invention provides a spotlighting system that is rugged and durable for use in the field. Still further objects and advantages will become apparent from a consideration of the ensuing description and drawings.

DRAWING FIGURES

Figure 1:
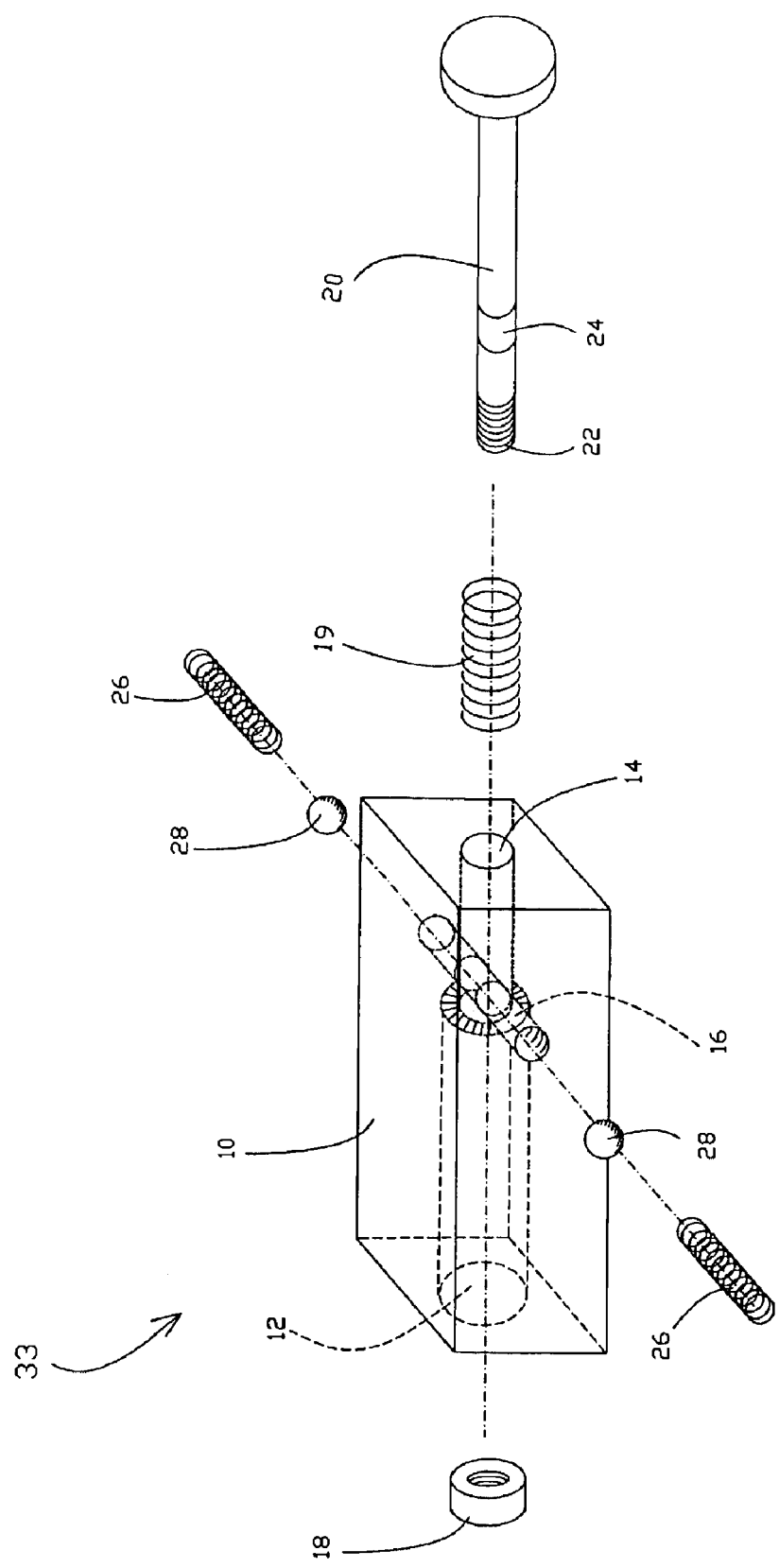
FIG. 1 shows an exploded perspective view of the spotlight control mechanism.

| Reference Numerals in Drawings |
| --- |
| 10 acrylic spotlight control module housing |
| 12 sync screw channel |
| 14 trigger channel |
| 16 contact channel |
| 18 cable release coupler |
| 19 spotlight trigger return spring |
| 20 nylon trigger |
| 21 coupling recess |
| 22 trigger threads |
| 24 metallic trigger contact band |
| 26 ball bearing springs |
| 28 ball bearing conductive contact |
| 29 sync screw channel threads |
| 30 battery pack |
| 31 spotlight control module with sync screw |
| 33 spotlight control module |
| 35A sync screw type-A |
| 35B sync screw type-B |
| 36 camera |
| 37 camera shutter release button |
| 38 idle spring |
| 40 terminal contact post insulator |
| 44 terminal contact-1 |
| 45 terminal contact-2 |
| 46 terminal contact post |
| 50 female phono plug |
| 51 male phono plug |
| 52 phono plug momentary switch assembly |
| 54 copper contact plate |
| 56 piston |
| 58 sync screw trigger stop |
| 60 sync adjust screw |
| 61 sync adjust screw threads |
| 62 trigger stop screw |
| 63 longitudinal through hole |
| 64 sync screw lock nut |
| 66 set screw |
| 68 sync screw trigger return spring |
| 69 500 mm cable release |
| 70 sync screw type-B trigger |
| 71 electronic shutter release cord |
| 72 cable release stem |
| 74 cable release head |
| 76 cable release plunger cap |
| 77 cable release plunger |
| 78 cable release sheath |
| 79 ball joint |
| 80 brass contact plate 1 |
| 81 brass contact plate 2 |
| 83 mounting plate |
| 85 shoulder mount for brass contact plate |
| 87 shoulder mount |

| -continued |
| --- |
| Reference Numerals in Drawings |
| 89 female spotlight phono plug |
| 91 pistol grip handle |
| 93 positive lead wire |
| 95 negative lead wire |
| 97 toggle override switch |
| 99 switch mounting screws |
| 101 positive terminal post for 89 |
| 103 negative terminal post for 89 |
| 105 center post of 97 |
| 107 alternate post of 97 |
| 109 positive lead wire of 80 |
| 111 cutout for 89 |
| 113 hole for 95 |
| 115 female input power plug |
| 117 input power cord |
| 119 spotlight power cord |
| 120 flash bracket arm |
| 121 spotlight |
| 122 flash unit |
| 123 spotlight control module mounting screws |
| 124A flash bracket base |
| 124B flash bracket riser |
| 125 sync screw contact |
| 126 trigger screw contact |
| 127 insulator for 125 |
| 128 6.4 mm nylon cable clamp |
| 129 mounting block for 74 |
| 130 lead wire of 125 |
| 131 mounting block for 125 |
| 132 assembled sync screw contact |
| 133 copper washer contact |
| 134 flex spring |
| 135 contact arm |
| 136 elbow pivot |
| 138 flashlight lamp |
| 140 flashlight body |
| 142 PVC pipe end cap |
| 144 sync collar |
| 144b sync collar screw |
| 146 sync collar channel |
| 148 sync collar set screw |

A First Preferred Embodiment—FIGS. 1 to 23 and FIGS. 31 to 36

DETAILED DESCRIPTION

Figure 18:
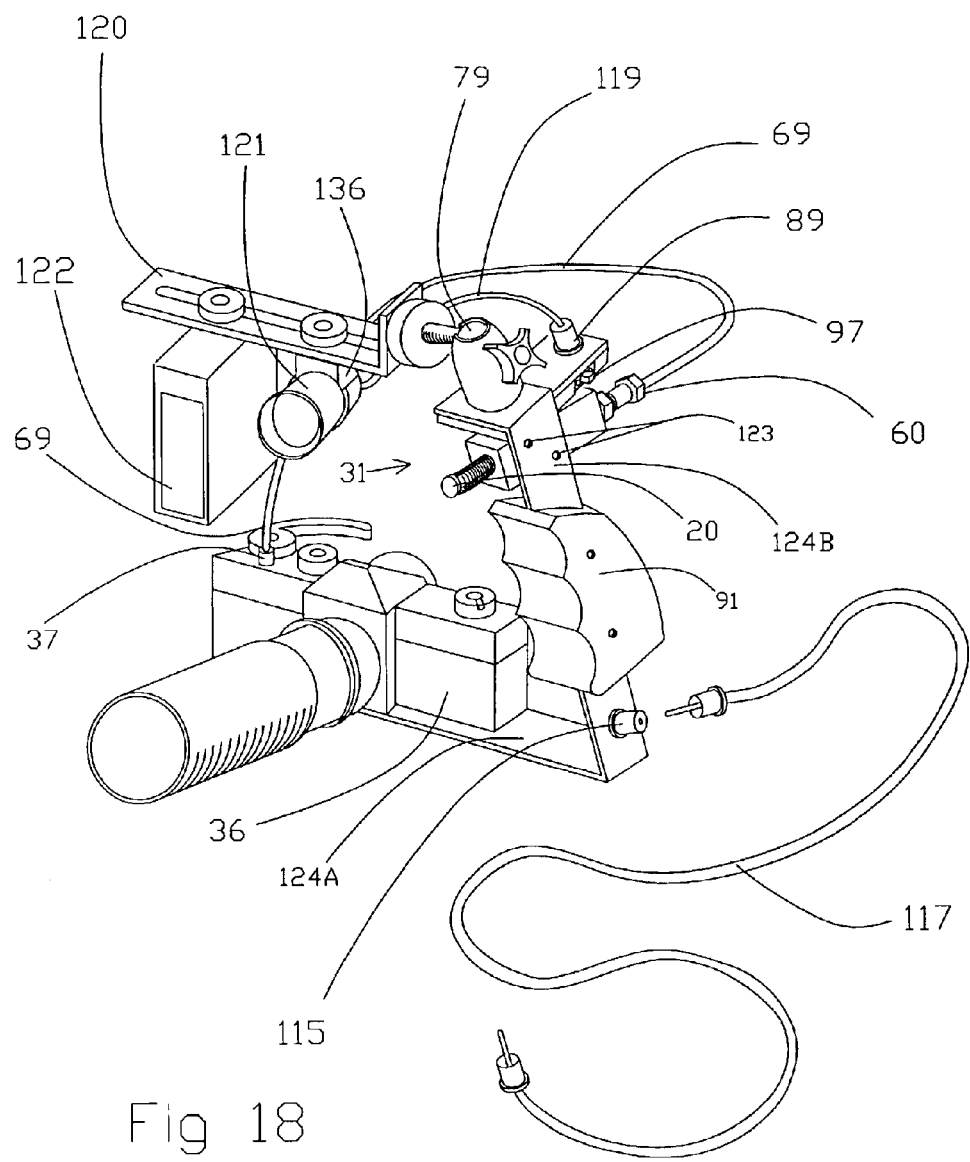
FIG. 18 shows a perspective view of a completely assembled Flash bracket spotlight system with camera and flash unit.

A typical embodiment of the Flash bracket spotlight system is illustrated in FIG. 18 (perspective view). A spotlight 121 and a flash unit 122 are mounted on a flash bracket arm 120. The flash bracket arm 120 is then attached to a flash bracket riser 124B by a ball joint 79. Thus the flash bracket arm 120 can be positioned to point the spotlight 121 and the flash unit 122 in any direction as required for photographic purposes. In the preferred embodiment, the flash bracket arm 120, flash bracket riser 124B and the flash bracket base 124A are constructed from aluminum strap, typically 3.2 mm in thickness and 12 mm in width. In the preferred embodiment, the flash bracket has an L-shaped Frame with a flash bracket base 124A providing a mounting platform for the camera and a flash bracket riser 124B coming up alongside the camera and pulled forward roughly 45 degrees.

Figure 19:
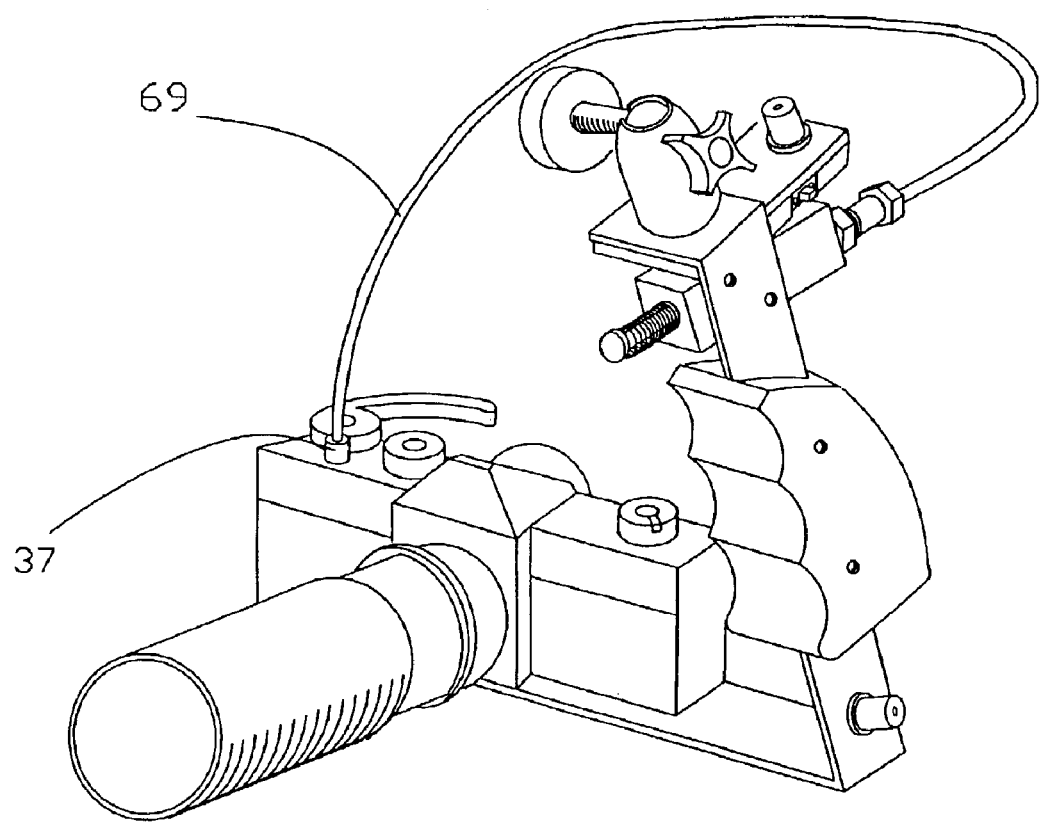
FIG. 19 shows a view of the Flash bracket spotlight system with the flash and spotlight arm removed to improve the view of the connection of the cable release to the camera's shutter release button.
Figure 31:
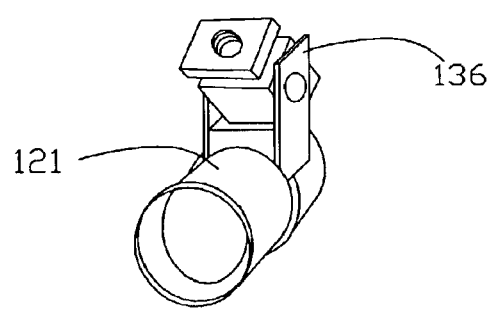
FIG. 31 shows a spotlight lamp mounted to an elbow joint.
Figure 32:
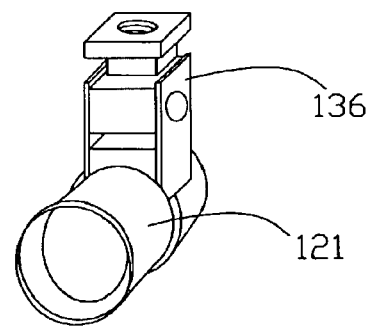
FIG. 32 shows an alternate position of the elbow joint from that shown in FIG. 31.
Figure 33:
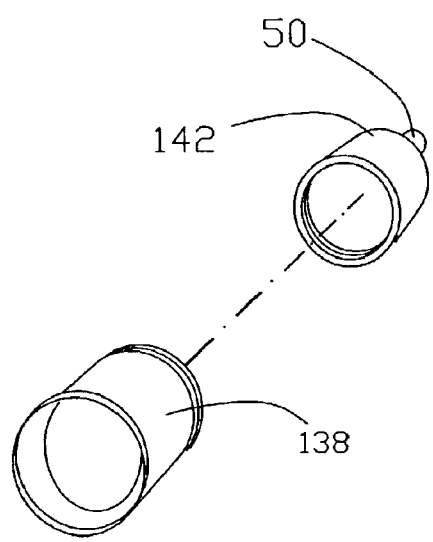
FIG. 33 shows a flashlight lamp mated with a standard PVC plumbing pipe end cap to form a spotlight.
Figure 34:
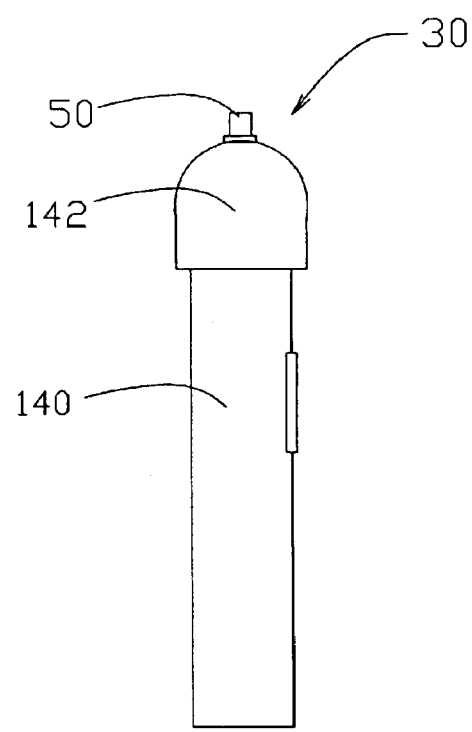
FIG. 34 shows a flashlight body mated with a standard PVC plumbing end cap to form a power supply housing for the spotlight.
Figure 35:
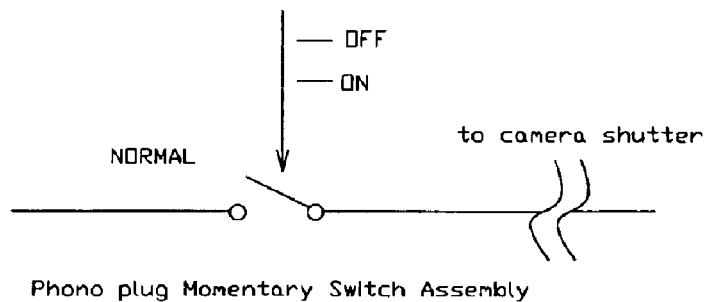
FIG. 35 Shows a circuit diagram for the Phono Plug Momentary Switch.
Figure 36:
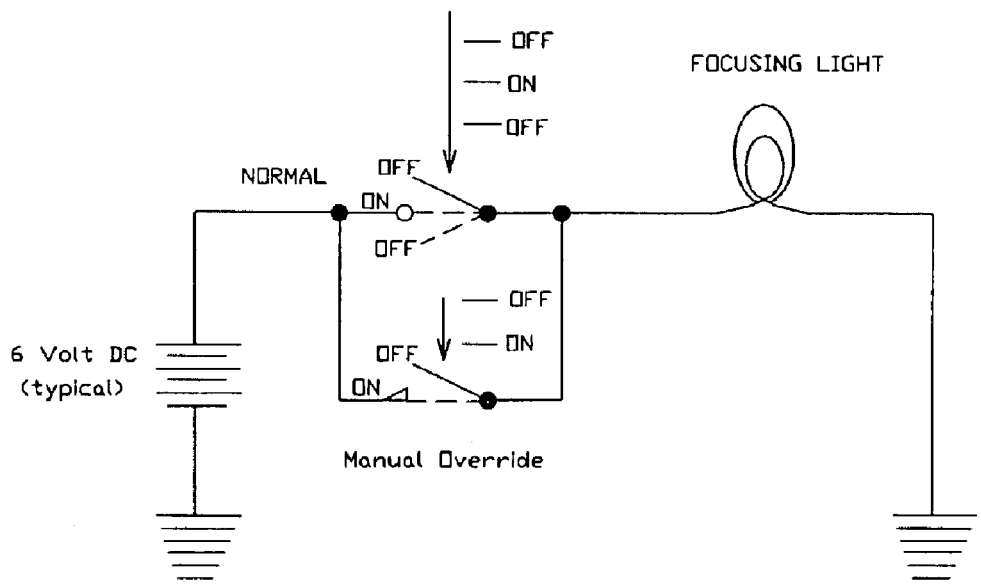
FIG. 36 Shows a circuit diagram for the Spotlight Control Module.

A pistol grip handle 91 is fixed to the flash bracket riser 124B, and is situated so that a nylon trigger 20 is available to the person that is holding the flash bracket by the pistol grip handle 91. The nylon trigger 20 communicates with a power source 140 and a 500 mm cable release cord 69 by way of a spotlight control module with sync screw 31. Thus, when the nylon trigger 20 is pressed, both the spotlight 121 and the 500 mm cable release cord 69 become activated. FIG. 18 shows that the spotlight 121 receives power by way of a spotlight power cord 119 plugged into a female spotlight phono plug 89. The 500 mm cable release cord 69 can be seen to protrude from a sync adjust screw 60 and eventually terminates at a camera shutter release button 37. FIG. 19 provides a less obstructed view of the 500 mm cable release cord 69 making a connection to the camera shutter release button 37. The power supply for the Flash bracket spotlight system is typically a 3-cell flashlight 140 equipped with size D batteries as shown in FIG. 34. In FIG. 34 a flashlight lamp 138 portion of a flashlight has been removed from the flashlight body 140 and replaced with a PVC, plumbing type end cap that has been fitted with a female phono plug 50. This then can be used with an input power cord 117 FIG. 18, to make electrical contact to the flash bracket via a female input power plug 115 as shown in FIG. 18. This embodiment of the flash bracket spotlight system is designed to be portable for fieldwork at night. An alternate approach (not shown) for creating a power source is to keep the flashlight intact, and simply add a female phono plug 50 on the butt end of a flashlight body. This can be used with an input power cord 117 FIG. 18, to make electrical contact to the flash bracket via a female input power plug 115 as shown in FIG. 18. In this way, the photographer can use the flashlight for its intended purpose, as well as a power source for the invention. FIG. 33 illustrates the combination of a PVC pipe end cap 142 with the flashlight lamp 138 to create a spotlight. FIG. 31 shows the spotlight 121 mounted to an elbow pivot 136. FIG. 32 demonstrates another possible position for the elbow pivot 136. The elbow pivot 136 can be bought at a well-stocked photo supply store. A small ball-joint will also work as a spotlight mount. The pistol grip handle 91 and the flash bracket arm 120 were scavenged from an inexpensive, commercially available L bracket that is widely available at photo supply stores.

Figure 2:
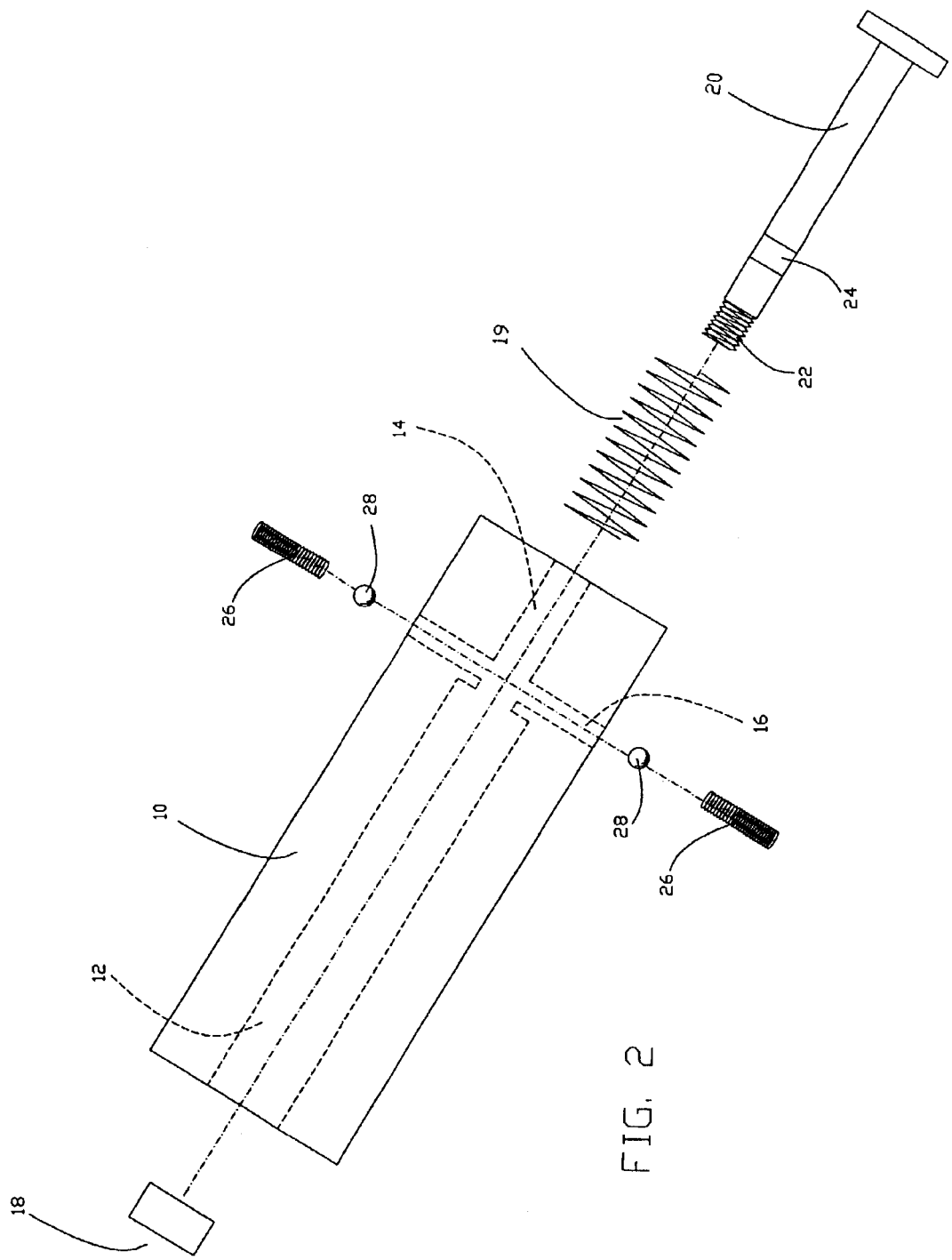
FIG. 2 shows an exploded plan view of the spotlight control mechanism.
Figure 3:
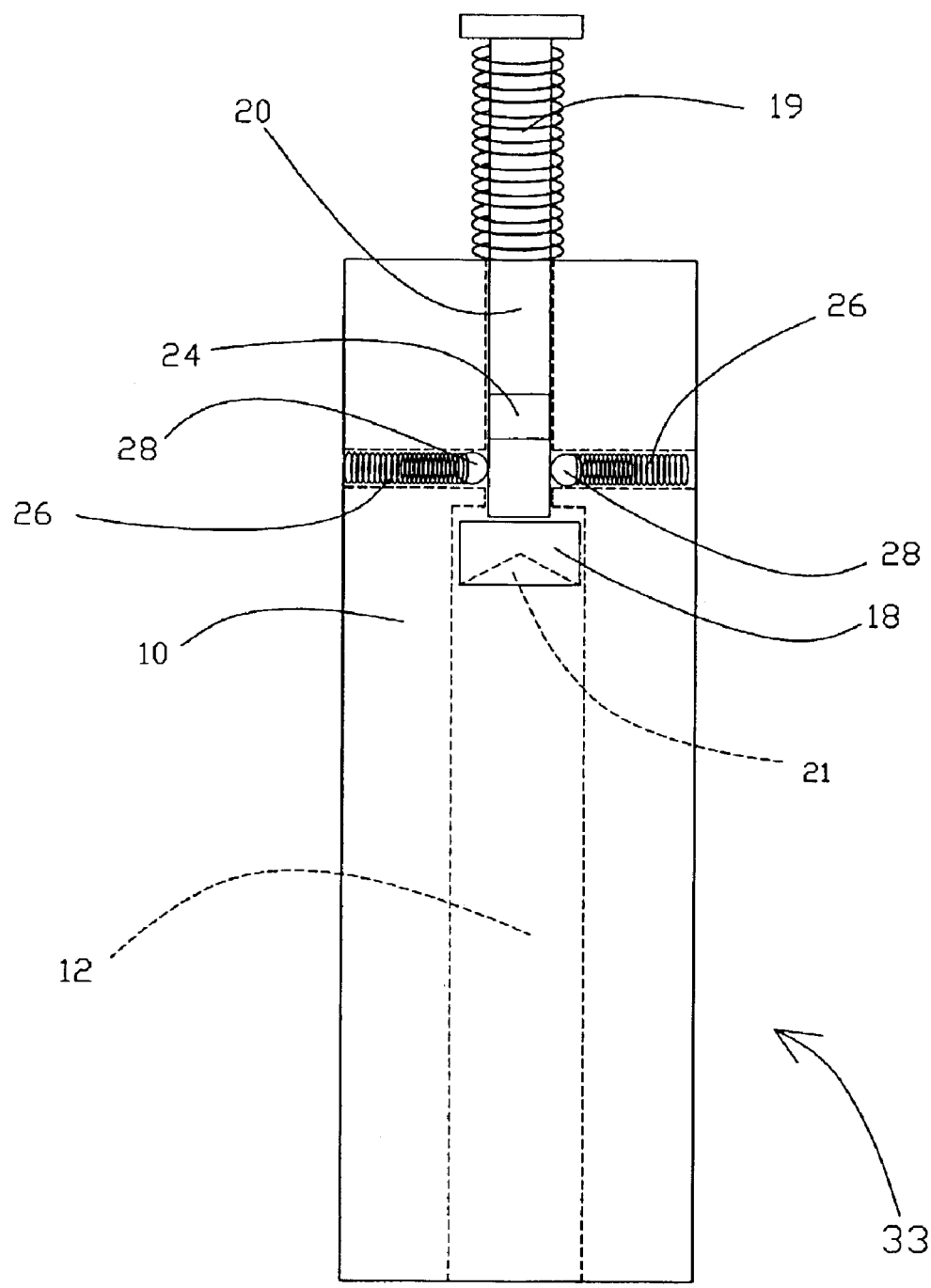
FIG. 3 shows an assembled plan view of the spotlight control mechanism.
Figure 20:
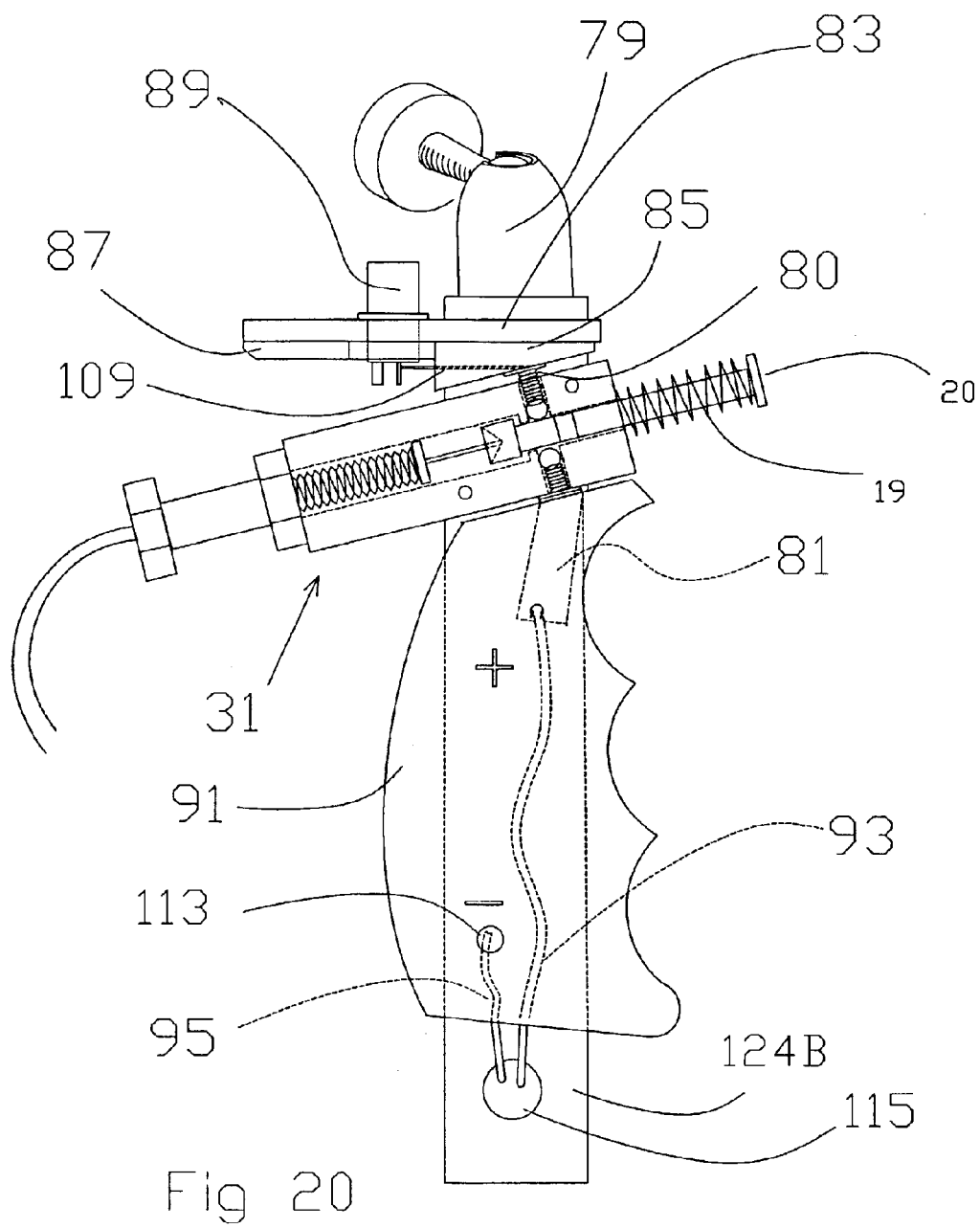
FIG. 20 shows a side view of the spotlight control mechanism mounted to the flash bracket.
Figure 21:
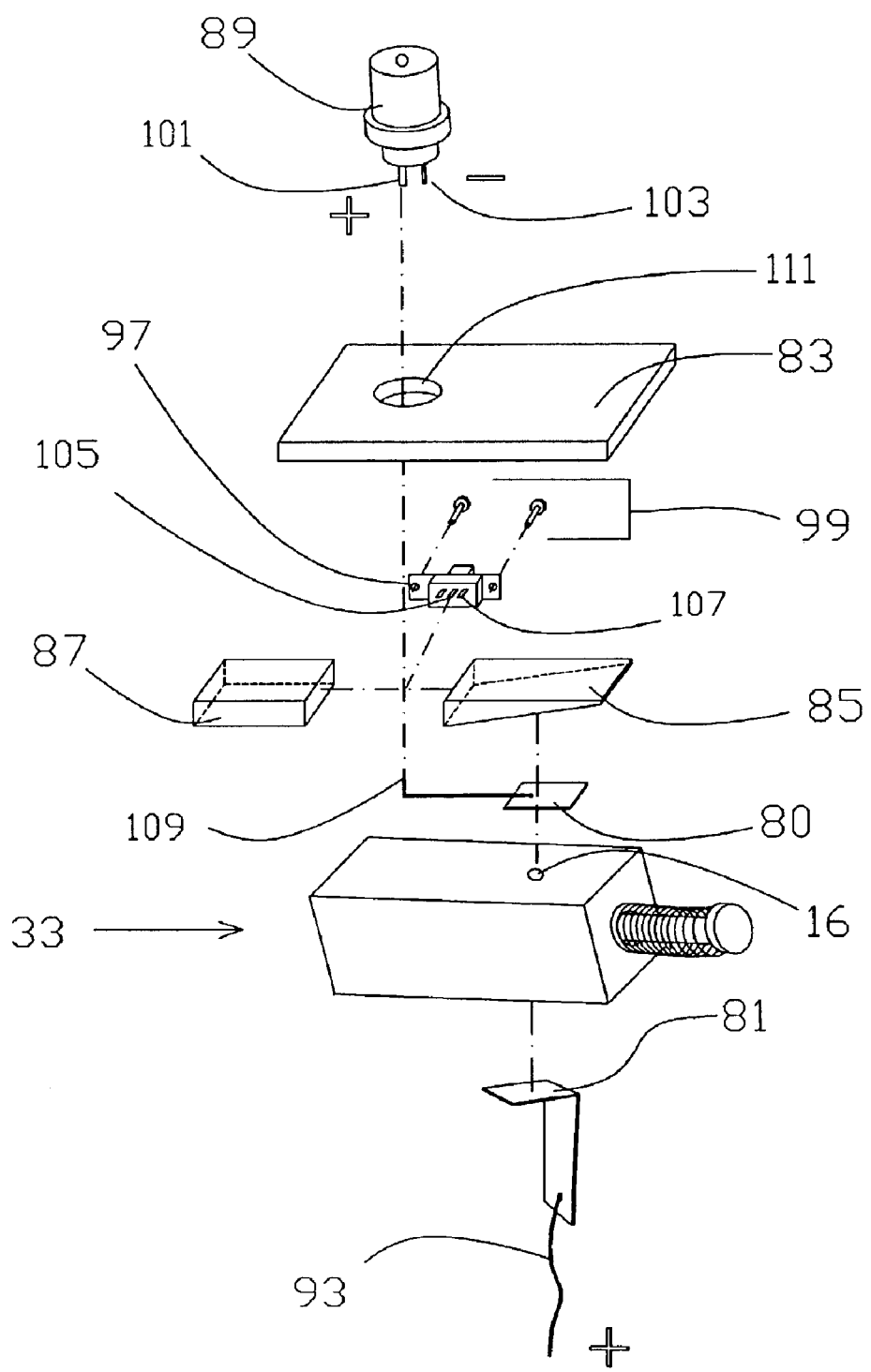
FIG. 21 shows an exploded perspective view of the mounting platform for the spotlight control mechanism.
Figure 22:
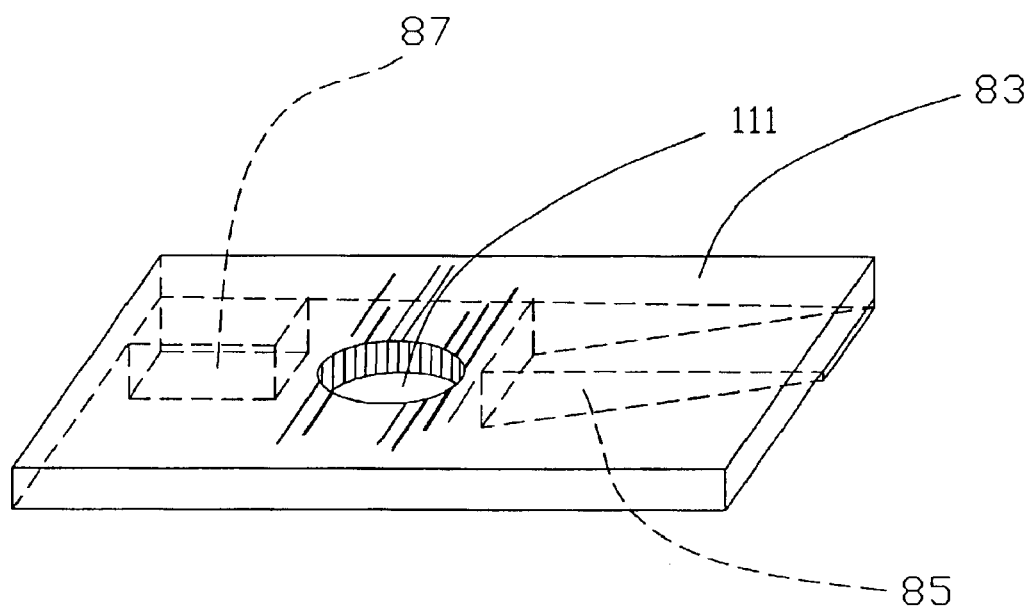
FIG. 22 shows an assembled perspective view of the mounting platform for the spotlight control mechanism.
Figure 23:
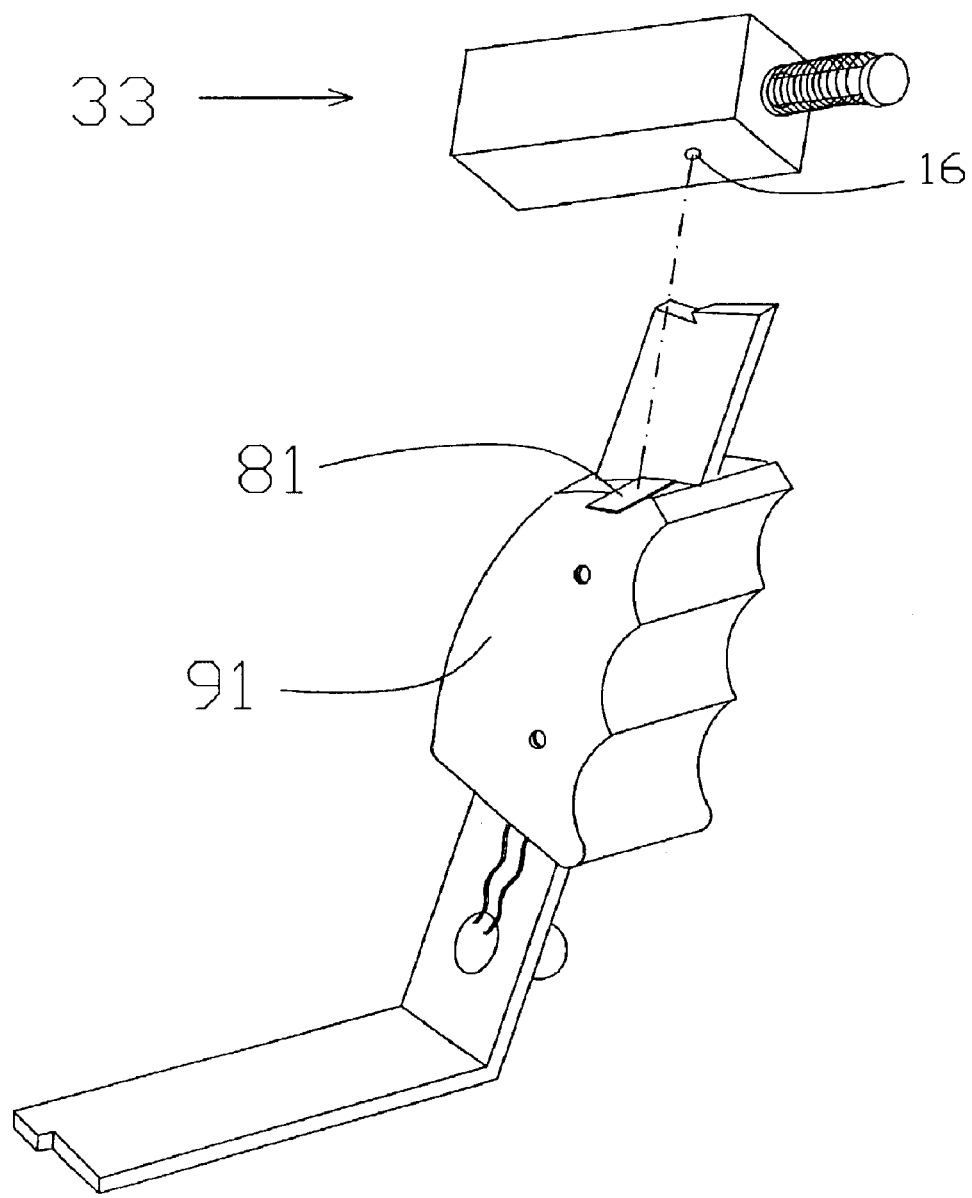
FIG. 23 shows a perspective view of the proper orientation of the spotlight control mechanism to an electrical contact plate.

FIG. 20 shows a side view relative to the camera position of the flash bracket riser 124B. In the preferred embodiment, the pistol grip handle 91 protects and hides a negative lead wire 95 and a positive lead wire 93 while also serving to hold in place a brass contact plate-2 81. The negative lead wire 95 and positive lead wire 93 are shown in FIG. 20 to be connected to a female input power plug 115 near the base of the pistol grip handle 91. The female input power plug 115 can also be seen from the perspective view of FIG. 18. The spotlight control module with sync screw 31 is shown in FIG. 20 to be held in place between a brass contact plate-2 81 and a brass contact plate-1 80 by two spotlight control module mounting screws 123 as shown in FIG. 18. The brass contact plate-1 80 in FIG. 20 is held in place between the spotlight control module with sync screw 31 and a plurality of acrylic plastic pieces that can be seen in exploded perspective view in FIG. 21, and in assembled perspective view in FIG. 22. FIG. 21 shows how a mounting plate 83, a shoulder mount 87 and a shoulder mount for brass contact plate 85 come together to form a mounting platform for a toggle override switch 97, a female spotlight phono plug 89 and a brass contact plate-1 80. FIG. 21 also shows how one opening of a contact channel 16 is lined up with the brass contact plate-1 80, and suggests a similar arrangement for the side of the spotlight control module 33 that faces the brass contact plate-2 81. FIG. 23 shows how one opening of a contact channel 16 is lined up with brass contact plate-2 81, and also shows how brass contact plate-2 81 emerges from the pistol grip handle 91 so as to be available for contact with contact channel 16. FIG. 1 shows an exploded perspective view of the spotlight control module 33. FIG. 2 shows a plan view of the spotlight control module 33. FIG. 3 shows an assembled plan view of the spotlight control module 33.

In the preferred embodiment of the spotlight control module 33 as shown in FIG. 1, an acrylic spotlight control module housing 10, contains three channel voids. Namely, a sync screw channel 12 a trigger channel 14 and a contact channel 16. The sync screw channel 12 and the trigger channel 14 are longitudinally oriented within the acrylic spotlight control module housing 10. The contact channel 16 bisects the trigger channel 14. The spotlight control module 33 typically has overall dimensions of roughly 82 mm×30.16 mm×25.4 mm. The appropriate dimensions for the sync screw channel 12, the trigger channel 14 and the contact channel 16 relative to the dimensions described for the spotlight control module 33 are as follows:
 (a) The sync screw channel 12 has a length of 57.15 mm and a diameter of 12.7 mm
 (b) The trigger channel 14 has a length of 25.4 mm and a diameter of 6.35 mm
 (c) The contact channel 16 has a length of 30.16 mm and a diameter of 4.76 mm FIG. 2 and FIG. 3 show that the contact channel 16 bisects the trigger channel 14 about 1.6 mm from the point where trigger channel 14 merges with sync screw channel 12. FIG. 1 shows a nylon trigger 20, a spotlight trigger return spring 19 and a cable release coupler 18 in an exploded view. The nylon trigger 20 and the cable release coupler 18 are made of nylon plastic. The shaft of the nylon trigger 20 is 63.5 mm in length and 6.3 mm in diameter. The nylon trigger 20 has a metallic trigger contact band 24 located nearest the trigger threads 22. The metallic trigger contact band 24 must be perfectly flush with the shaft of the nylon trigger 20. The following method can be used to create the metallic trigger contact band 24:
 (a) Route a recessed area, approximately 4.76 mm in length, around the circumference of the nylon trigger 20 where the metallic trigger contact band 24 will be located.
 (b) Wind lightweight copper wire into the recessed area of the nylon trigger 20, until wire has exceeded that point where it would be flush with the shaft of the nylon trigger 20.
 (c) Apply melted solder to the wound copper wire until the solder has distributed itself evenly over the wire, and then quickly cool the entire nylon trigger 20 in water to prevent melt damage to the nylon trigger 20.
 (d) The nylon trigger 20 can be turned in a drill press chuck while applying a file against the wound wire mass until it becomes flush with the shaft of the nylon trigger 20.

FIG. 3 shows that when the cable release coupler 18 the spotlight trigger return spring 19 and the nylon trigger 20 are assembled, the metallic trigger contact band 24 must rest just clear of the point where contact channel 16 bisects trigger channel 14 of FIG. 2. FIG. 3 also shows that the spotlight trigger return spring 19 has enough tension to pull the cable release coupler 18 up against the point where trigger channel 14 merges with sync screw channel 12 At this stage in the assembly of the spotlight control module 33, one ball bearing conductive contact 28 and one ball bearing spring 26 should be introduced into the contact channel 16 on either side of the spotlight control module 33. The appropriate dimensions for the ball bearing conductive contact 28 relative to the dimension described for the contact channel 16 should be about 4.7 mm. The ball bearing spring 26 that shares the contact channel 16 with the ball bearing conductive contact 28 must be slightly smaller in diameter than the ball bearing conductive contact 28 to prevent binding between the wall of the contact channel 16 and the ball bearing conductive contact 28 and the ball bearing spring 26.

Figure 4A:
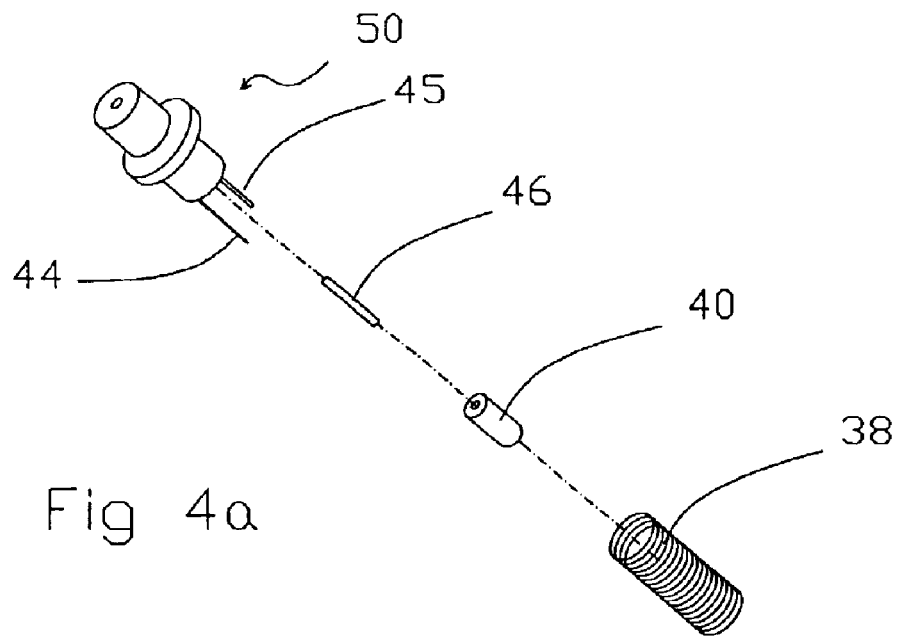
FIG. 4 shows three perspective views of the phono plug momentary switch in various stages of assembly.
Figure 4B:
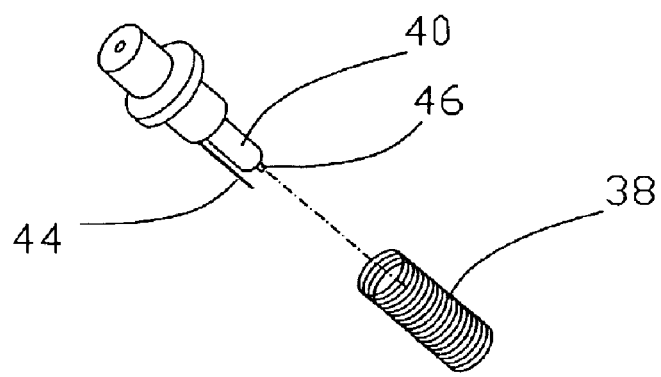
Figure 4C:
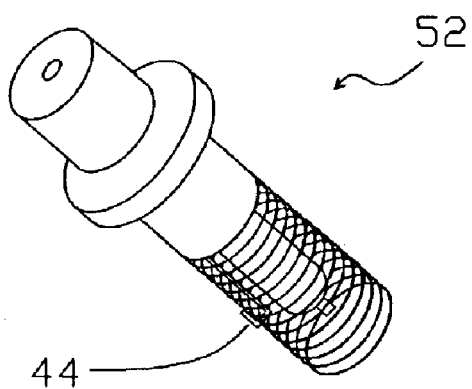
Figure 5:
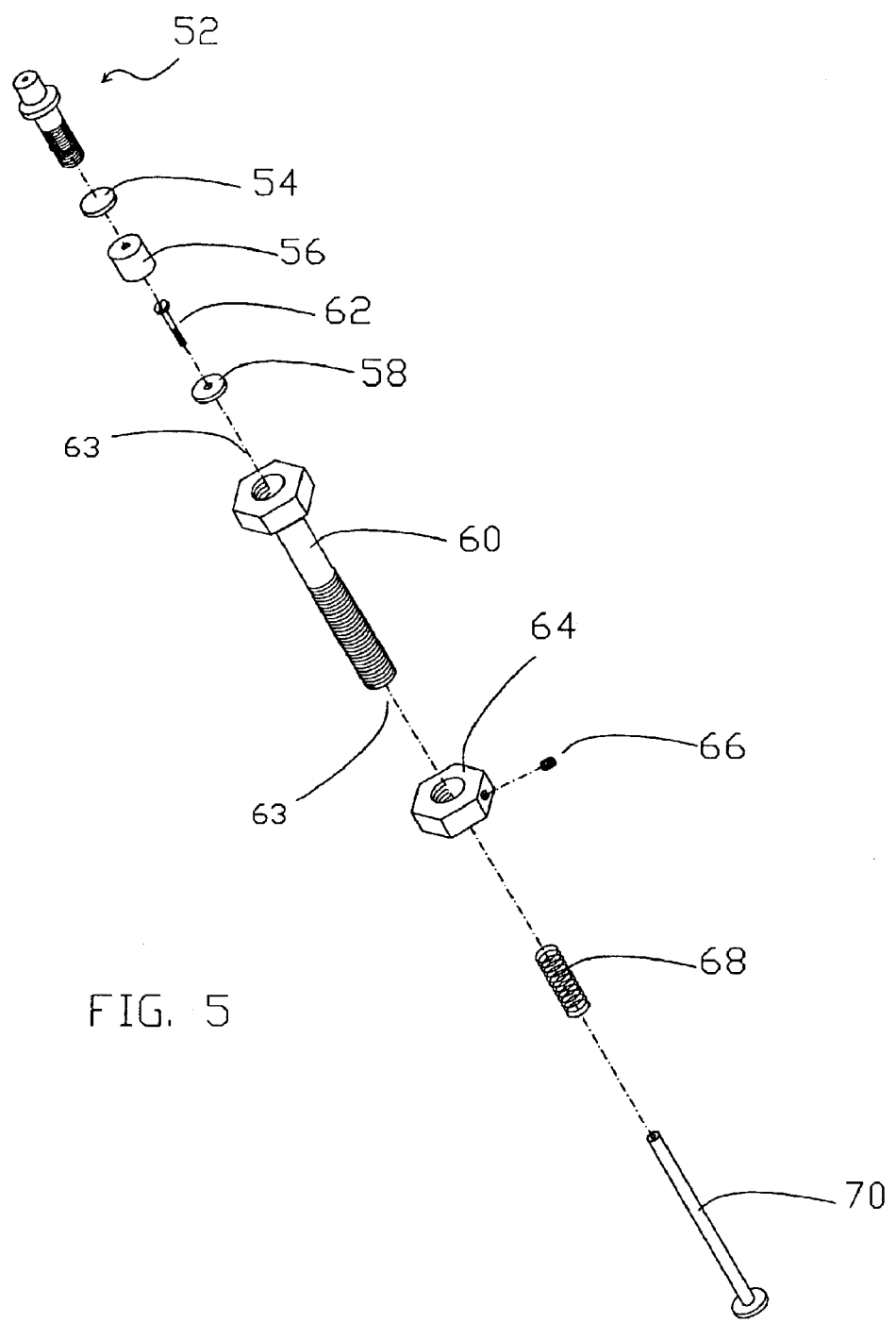
FIG. 5 shows an exploded perspective view of a type B sync adjust screw mechanism.
Figure 7:
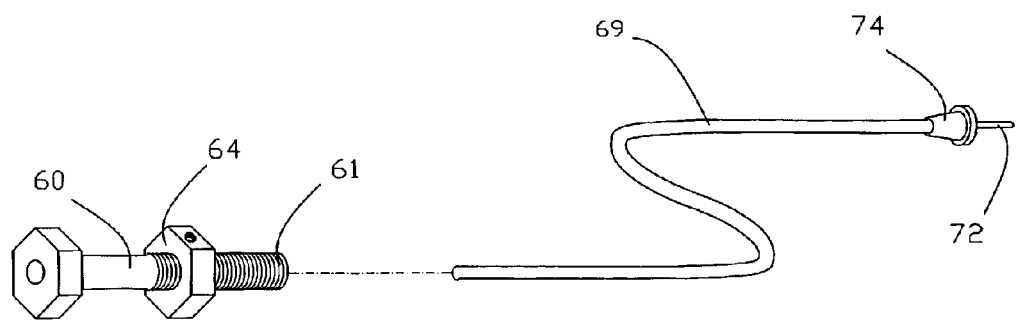
FIG. 7 shows an exploded perspective view of a type A sync screw with a cable release.
Figure 8:
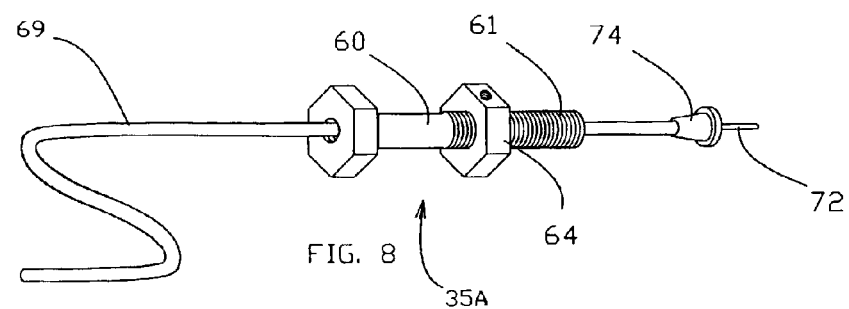
FIG. 8 shows an assembled perspective view of a type A sync screw with a cable release inserted.
Figure 9:
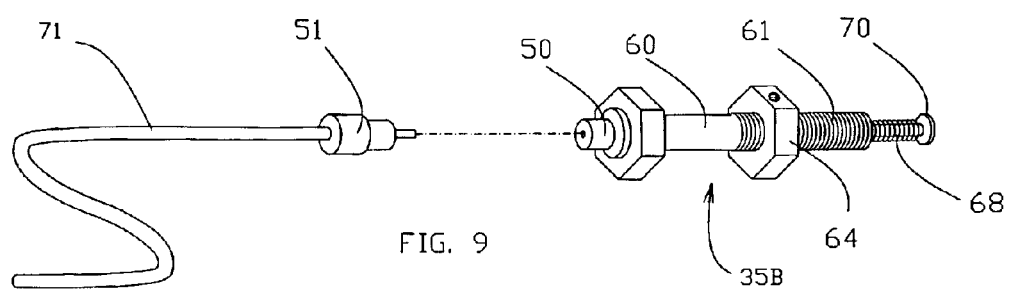
FIG. 9 shows an exploded view of a type B sync screw with a male phono plug cord.
Figure 10:
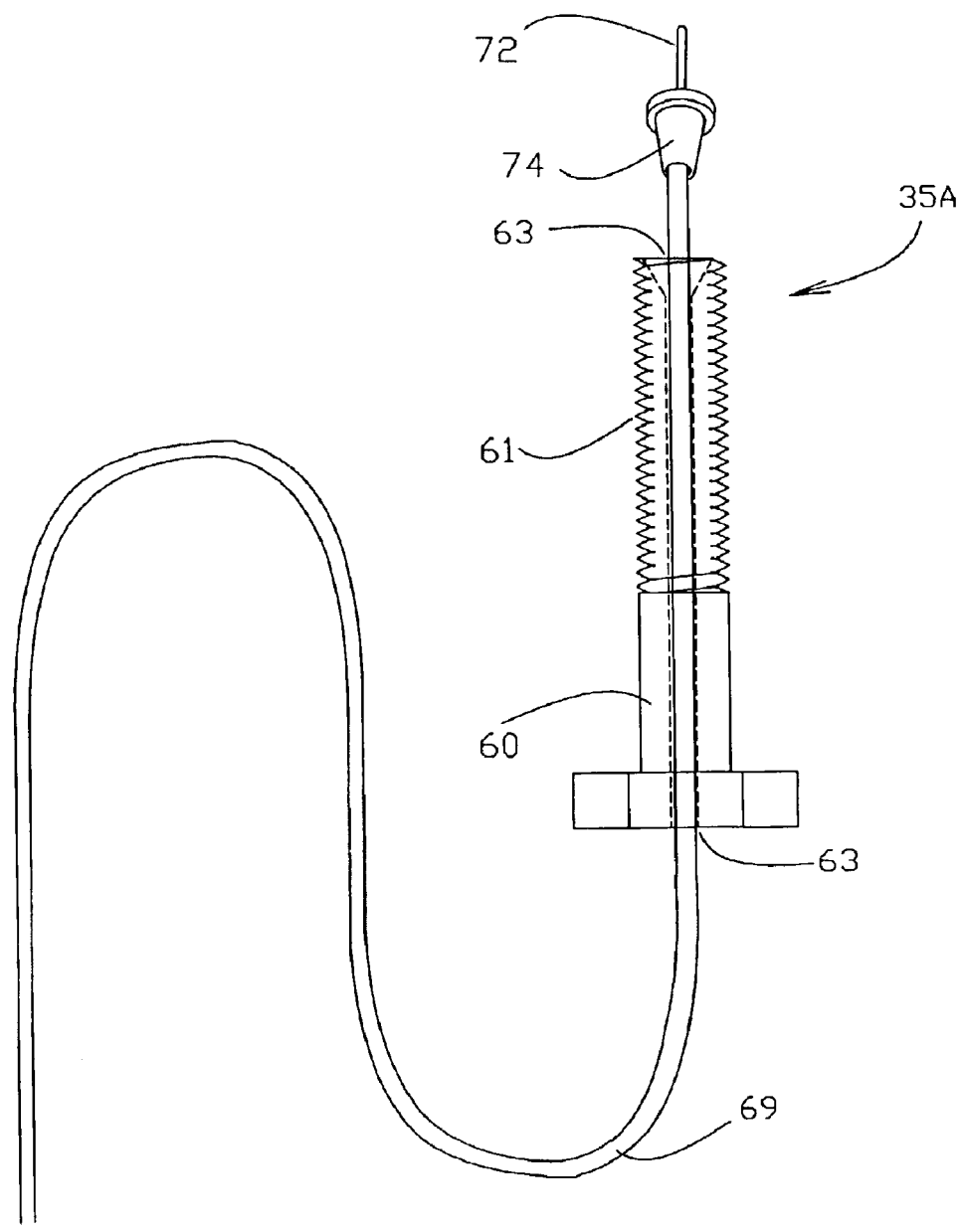
FIG. 10 shows an assembled plan view of a type A sync screw with a cable release inserted.
Figure 11:
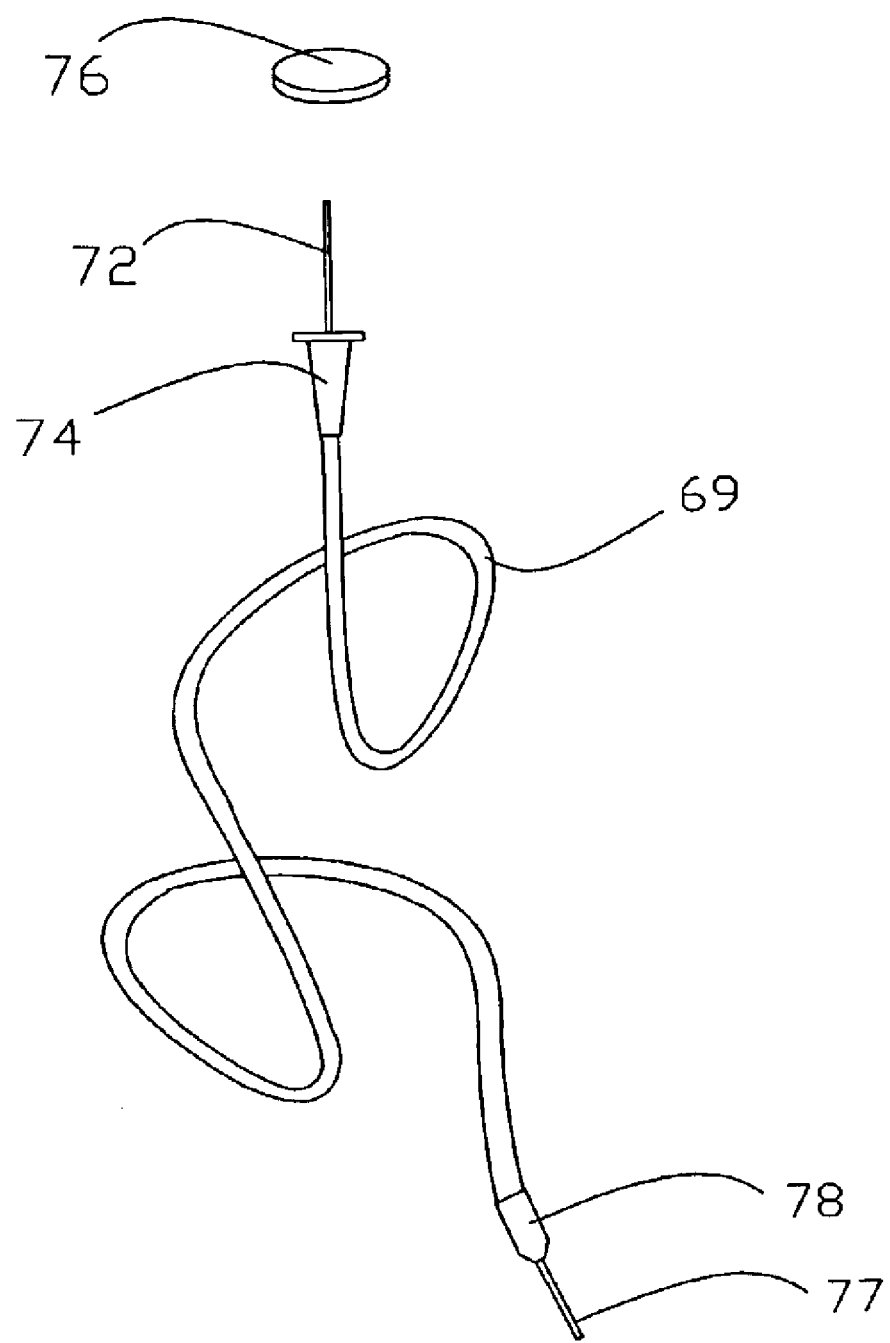
FIG. 11 shows a cable release that has been modified by removing the plunger cap from the stem.
Figure 12:
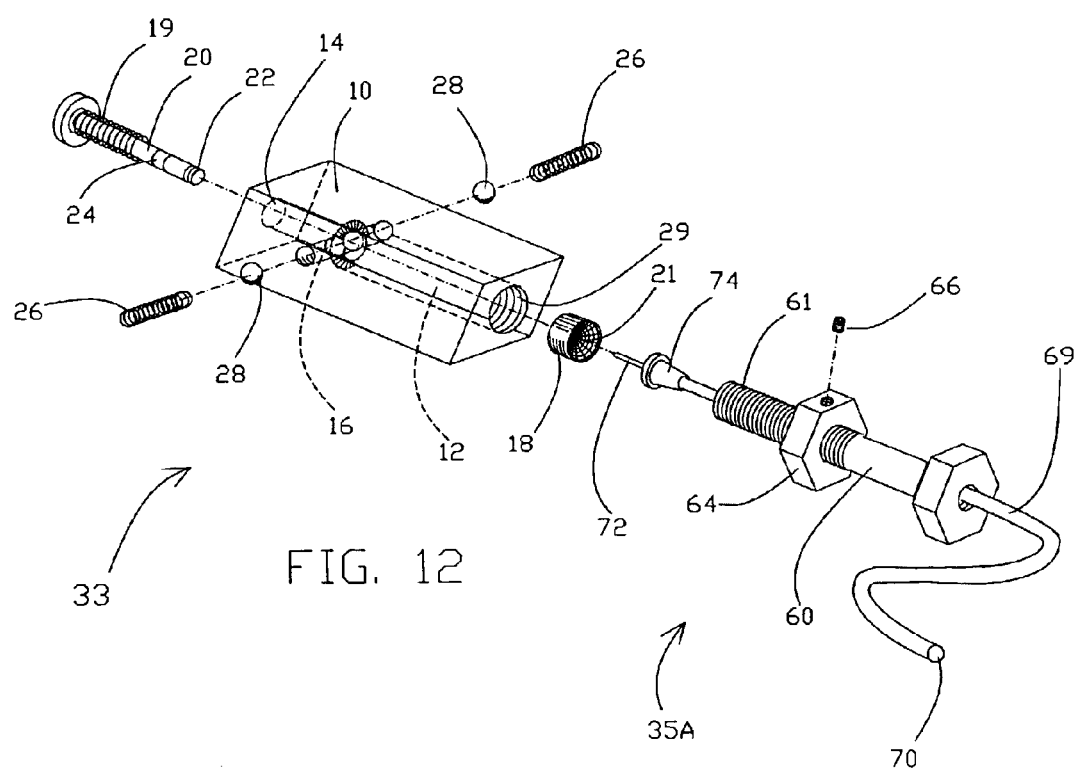
FIG. 12 shows an exploded perspective view of the spotlight control mechanism relative to the type A sync screw.
Figure 14:
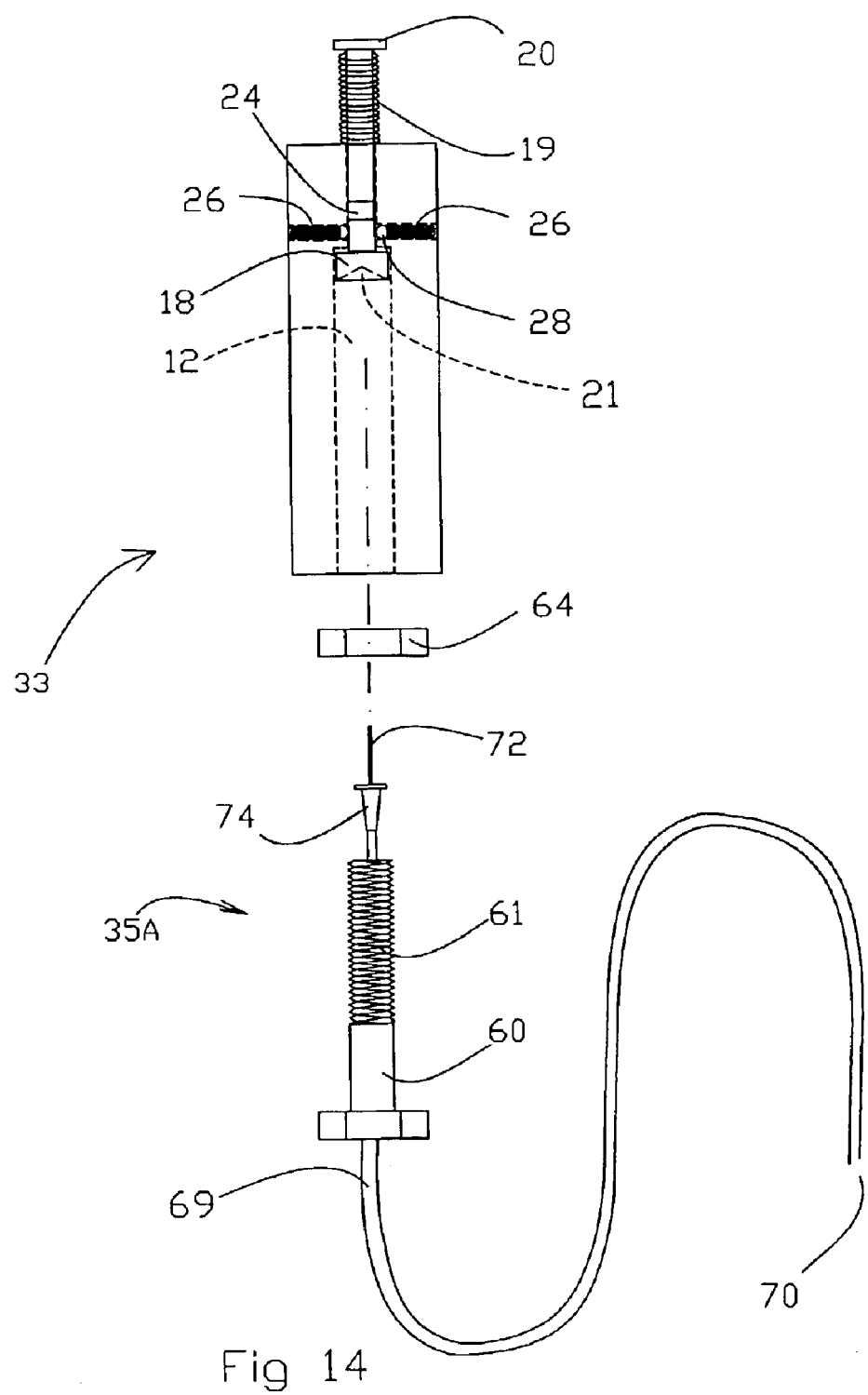
FIG. 14 shows a plan exploded view of the spotlight control mechanism relative to the type A sync screw.
Figure 15:
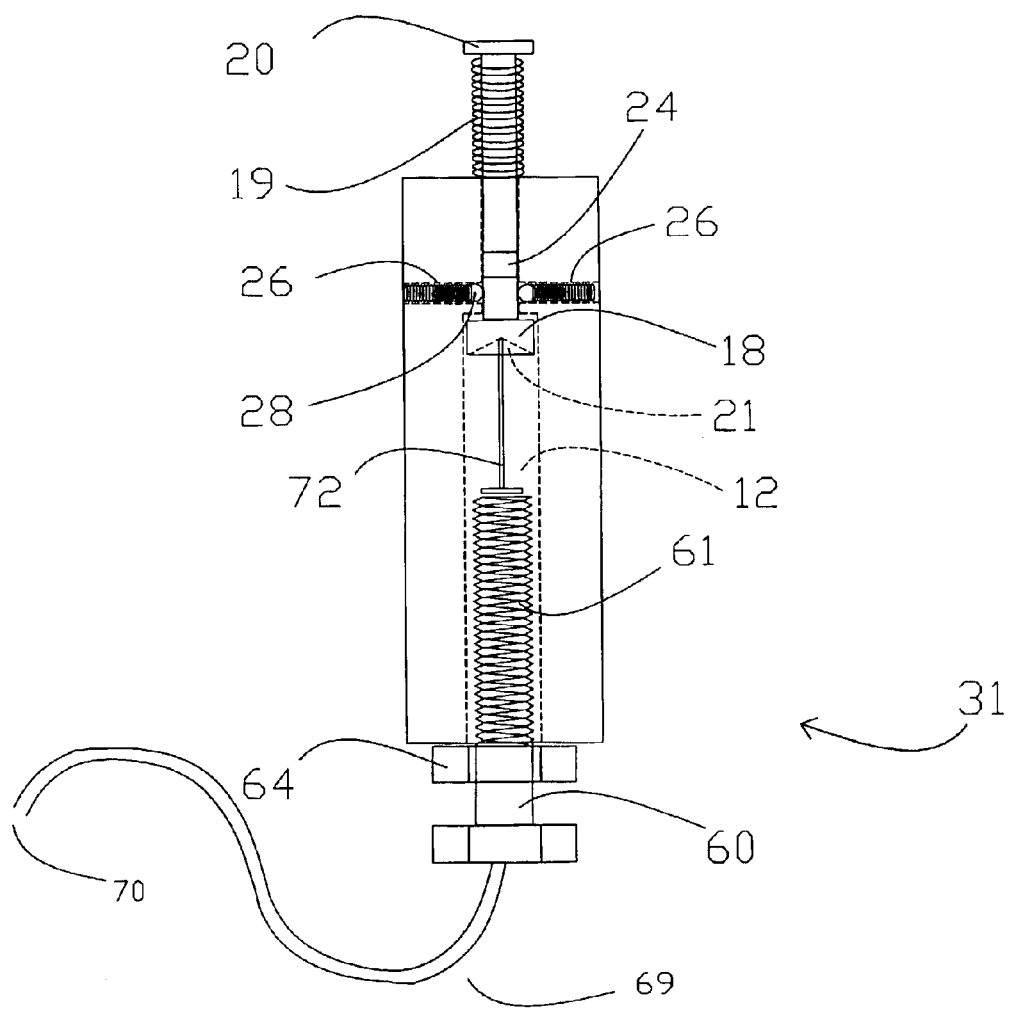
FIG. 15 shows a plan view of the spotlight control mechanism with the type A sync screw inserted.
Figure 16:
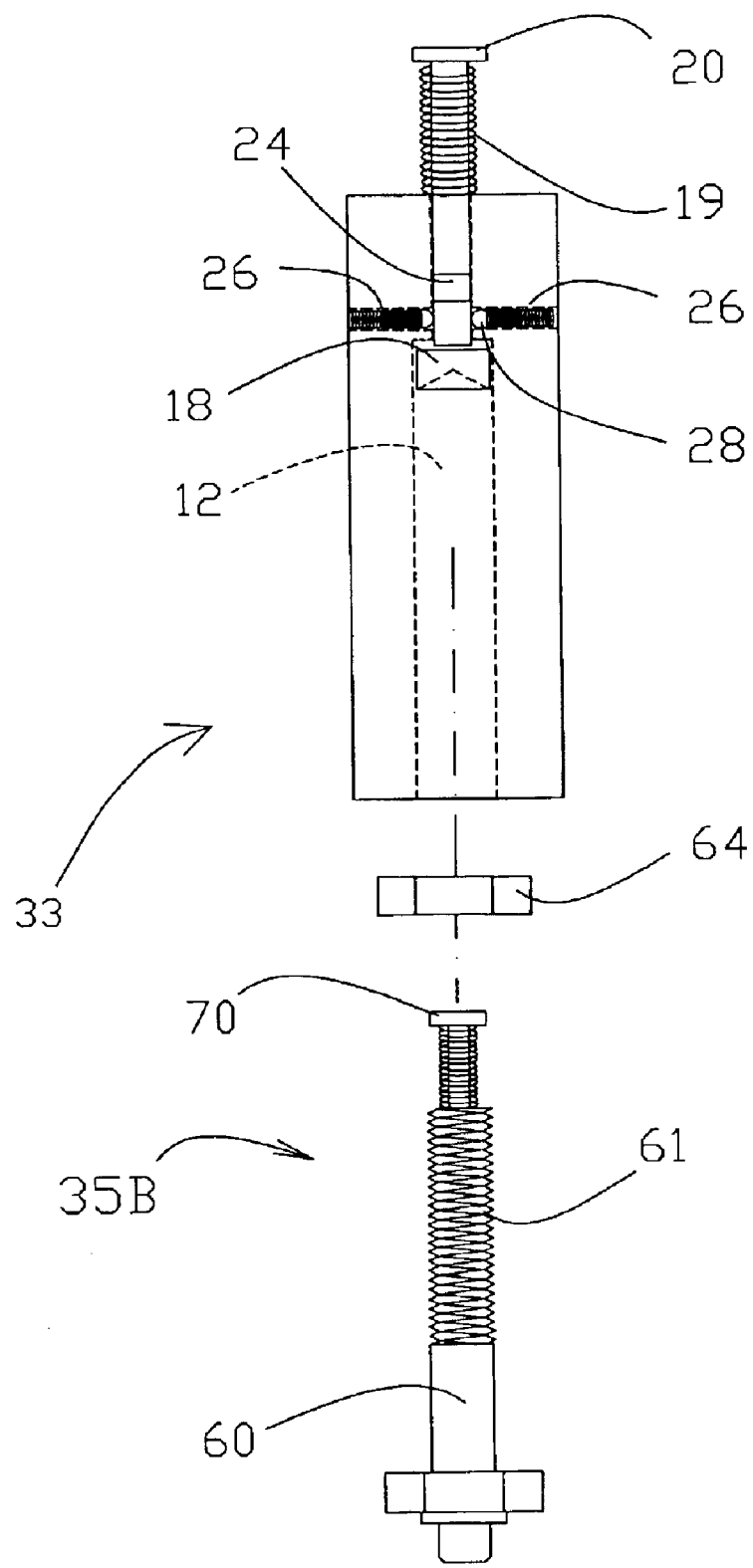
FIG. 16 shows a plan exploded view of the spotlight control mechanism relative to the type B sync screw.
Figure 17:
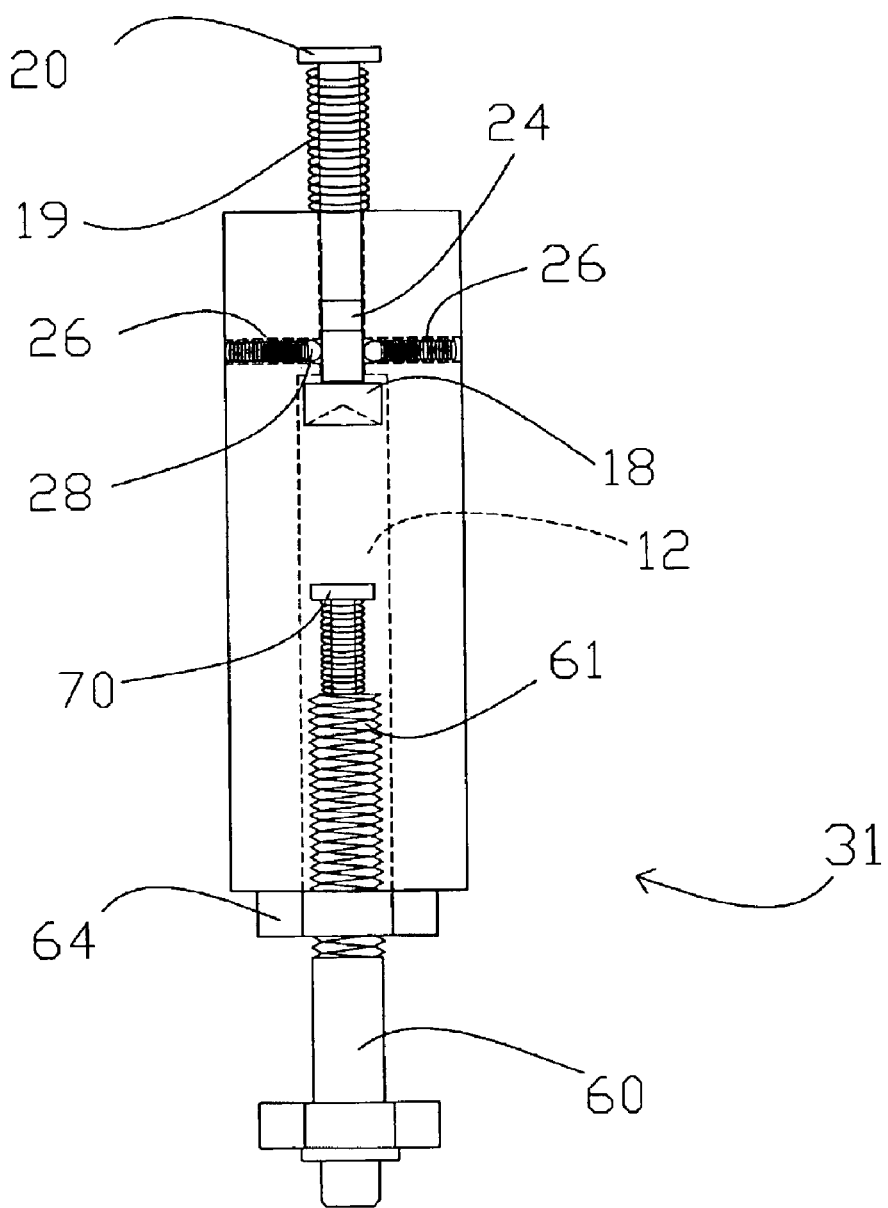
FIG. 17 shows a plan view of the spotlight control mechanism with the type B sync screw inserted.

FIG. 10 shows a side view of a sync screw type-A 35A, which consists of a nylon plastic bolt with a longitudinal through-hole 63 drilled through the center of the bolt. The shaft of the sync screw type-A 35A has a length of 63.5 mm and a diameter of 12.7 mm. FIG. 11 shows a standard photographic cable release with the cable release plunger cap 76 removed from the cable release stem 72. FIG. 10 shows the 500 mm cable release cord 69 of the cable release inserted through the sync screw type-A 35A so that the cable release head 74 emerges from the threaded end of the sync screw type-A 35A. FIG. 7 and FIG. 8 show perspective views of the assembly of the sync screw type-A 35A with a cable release. A sync screw lock nut 64 is also shown in FIG. 7 and FIG. 8. FIG. 14 shows an exploded plan view of the relationship between the sync screw type-A 35A and the spotlight control module 33. FIG. 15 shows an assembled plan view of the sync screw type-A 35A and the spotlight control module 33. Notice in FIG. 15, that the cable release stem 72 is inserted into a coupling recess 21 of the cable release coupler 18, so that the two are thus loosely coupled. FIG. 12 shows an exploded perspective view of the spotlight control module 33 and the sync screw type-A 35A. FIG. 12 shows a coupling recess 21 of the cable release coupler 18 wherein fits the cable release stem 72. Also shown in FIG. 12 are the sync screw channel threads 29 of the sync screw channel 12. The sync screw channel threads 29 match the sync adjust screw threads 61 of the sync screw type-A 35A so that the sync screw type-A 35A can be screwed into the sync screw channel 12 to a depth determined by the position of the sync screw lock nut 64 on the shaft of the sync screw type-A 35A. The sync screw channel threads 29 can be produced using a commercially available tap and die set. FIG. 12 also shows a setscrew 66 on the sync screw lock nut 64 to be used to lock sync screw lock nut 64 in position on the shaft of the sync screw type-A 35A. FIG. 9 shows a perspective view of a sync screw type-B 35B that uses a momentary switch rather than a cable release to trigger the camera release sequence. FIG. 16 shows an exploded plan view of the relationship between the sync screw type-B 35B and the spotlight control module 33. FIG. 17 shows an assembled plan view of the sync screw type-B 35B and the spotlight control module 33. The sync screw type-B 35B can be screwed into the sync screw channel 12 to a depth determined by the position of the sync screw lock nut 64 on the shaft of the sync screw type-B 35B. FIG. 5 shows an exploded perspective view of the sync screw type-B 35B assembly. A phono plug switch assembly 52, which behaves as a momentary switch, is shown in FIG. 4a as an exploded perspective view. FIG. 4a shows that a terminal contact post 46, typically made of copper, is soldered to a terminal contact-2 45, which protrudes near the center of a female phono plug 50. A terminal contact post insulator 40 made of plastic is slid over the terminal contact post 46. The terminal contact post 46 must protrude slightly from the terminal contact post insulator 40 as shown in FIG. 4B. An idle spring 38 is slipped over the terminal contact-1 44 and terminal contact post insulator 40 to complete the assembly of the phono plug switch 52. Note that in FIG. 4C, the terminal contact-1 44 is crimped over a portion of the idle spring 38 to serve to hold the idle spring 38 in place. There should be some compression of the idle spring 38 where terminal contact-1 44 is crimped thereon so as to assure good electrical contact between the terminal contact-1 44 and the idle spring 38.

Figure 6:
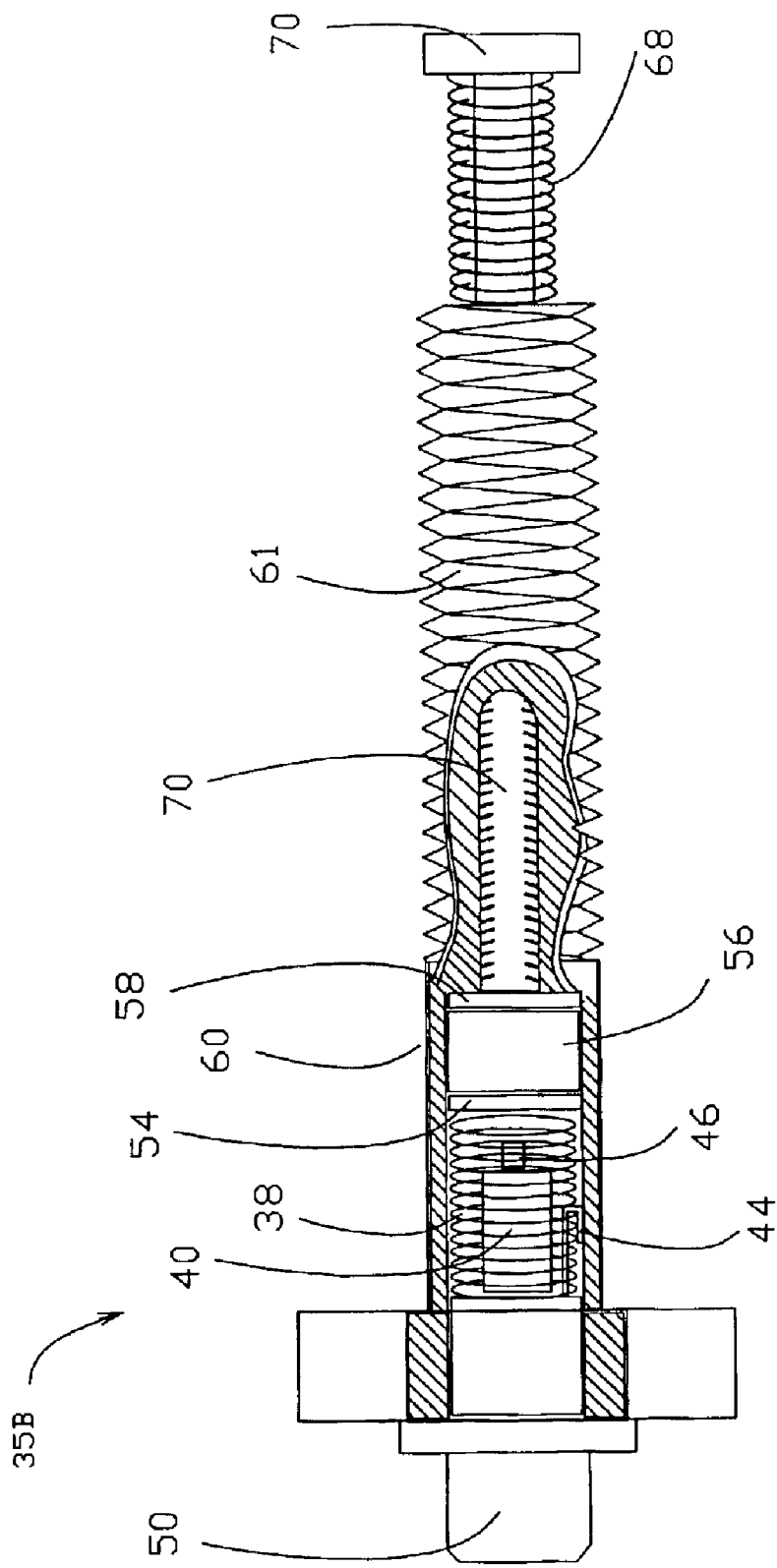
FIG. 6 shows a sectional view of a type B sync adjust screw mechanism.

FIG. 6 shows a side view with cut away viewing of the sync screw type-B 35B. FIG. 5 shows an exploded view of the sync screw type-B 35B. A nylon plastic sync screw type-B trigger 70 is inserted through a sync screw trigger return spring 68, then this combination is inserted into a longitudinal through-hole 63 that runs completely through the shaft of the sync screw type-B 35B. The dimensions of the sync screw type-B trigger 70 are identical to the nylon trigger 20. The diameter of the through-hole of the sync screw type-B 35B is 6.35 mm. The non-threaded shaft portion of the sync screw type-B 35B has been bored out to make a cavity to hold the phono plug switch assembly 52. The inside diameter of the cavity is roughly 12 mm. A trigger stop screw 62 is passed through a sync screw trigger stop 58 and then screwed into the end of the sync screw type-B trigger 70. The sync screw trigger stop 58 should be some diameter greater than 6.35 mm, and less than 12 mm. Thus the sync screw type-B trigger 70 is held into place within the shaft of the sync screw type-B 35B. The sync screw trigger return spring 68 has enough tension to pull the sync screw trigger stop 58 up against the point where the 12 mm diameter cavity merges with the 6.35 mm longitudinal through-hole. A plastic piston 56 is dropped loosely into the 12 mm diameter cavity. The piston 56 is roughly 11 mm in diameter, and has a recessed area at one end to accommodate the head of the trigger stop screw 62. A copper contact plate 54 is next dropped into the cavity. The phono plug switch assembly 52 is screwed into the hex cap end of the sync screw type-B 35B to complete the assembly. FIG. 6 shows that the idle spring 38 should have enough reach to push back against the copper contact plate 54 and the piston 56, thus holding those two parts clear away from terminal contact post 46. The relatively loose fit of the piston 56 inside the cavity assures that the copper contact plate 54 will be pushed forward to make contact with the terminal contact post 46 without the possibility of binding with the walls of the cavity. The use of such freely floating parts also eliminates the need for high precision in the manufacture of sync screw type-B 35B. FIG. 20 shows a side view relative to the camera position of the negative lead wire 95 and the positive lead wire 93. The negative lead wire 95 exits to the other side of the flash bracket riser 124B where it remains concealed by the pistol grip handle 91. The negative lead wire 95 emerges near the top of the pistol grip handle 91 and discreetly makes a path (not shown) to negative terminal post 103 FIG. 21, of the female spotlight phono plug 89. FIG. 20 also shows a positive lead wire 93 connected to the brass contact plate-2 81. The brass contact plate-2 81 is pressed into contact with the metal of the flash bracket riser 124B to make a ground connection. A connection is made between a positive lead wire 109 of the brass contact plate-1 80 to a positive terminal post 101 of the female spotlight phono plug 89. A final wire connection (not shown) is made from an alternate post 107 of the toggle override switch 97 to ground and from the center post 105 of the toggle override switch 97 to a positive terminal post 101 of the female spotlight phono plug 89.

Operation of the Spotlight Control Module FIGS. 1 to 23 and FIGS. 31 to 36

FIG. 15 shows an assembled spotlight control module 33 in plan view. The drawing shows that the nylon trigger 20, when pressed by the photographer, will engage the cable release stem 72 of a cable release, which is seated within the sync screw type-A 35A. The drawing further shows the metallic trigger contact band 24 will be moved into the path of two spring-loaded ball bearings 28. A circuit is completed when contact is made between the ball bearings and the metallic trigger contact band 24, thus spotlight 121 will be turned on. As the nylon trigger 20 is pressed further, the metallic trigger contact band 24 will move out of the path of the ball bearing conductive contact 28 and break the circuit, turning off the spotlight 121. At the very instant that the spotlight 121 is turned off the camera shutter is released by the continued pushing action between the cable release coupler 18 and the cable release stem 72. Thus the single action of pressing the nylon trigger 20 will perform three tasks:

The spotlight is turned on.

The spotlight is turned off.

The camera shutter is released just as the spotlight is turned off.

When the photographer releases pressure on the nylon trigger 20, the spotlight trigger return spring 19 will return the nylon trigger 20 back to an idle position. Synchronization of the spotlight 121 with the camera shutter is performed by the positioning of the sync screw type-A 35A within the sync screw channel 12. When the sync screw type-A 35A is moved forward into the sync screw channel 12, the spotlight 121 will turn off later, relative to the firing of the camera shutter. When the sync screw type-A 35A is moved back out of the sync screw channel 12, the spotlight 121 will turn off earlier, relative to the firing of the camera shutter. FIG. 12 shows that the threads on the shaft of the sync screw type-A 35A will engage with the matching sync screw channel threads 29. The task of positioning the sync screw type-A 35A within the sync screw channel 12 is performed by rotating the sync screw type-A 35A clockwise or counterclockwise.

Operation of the Sync Screw Type-B 35B.

Figure 13:
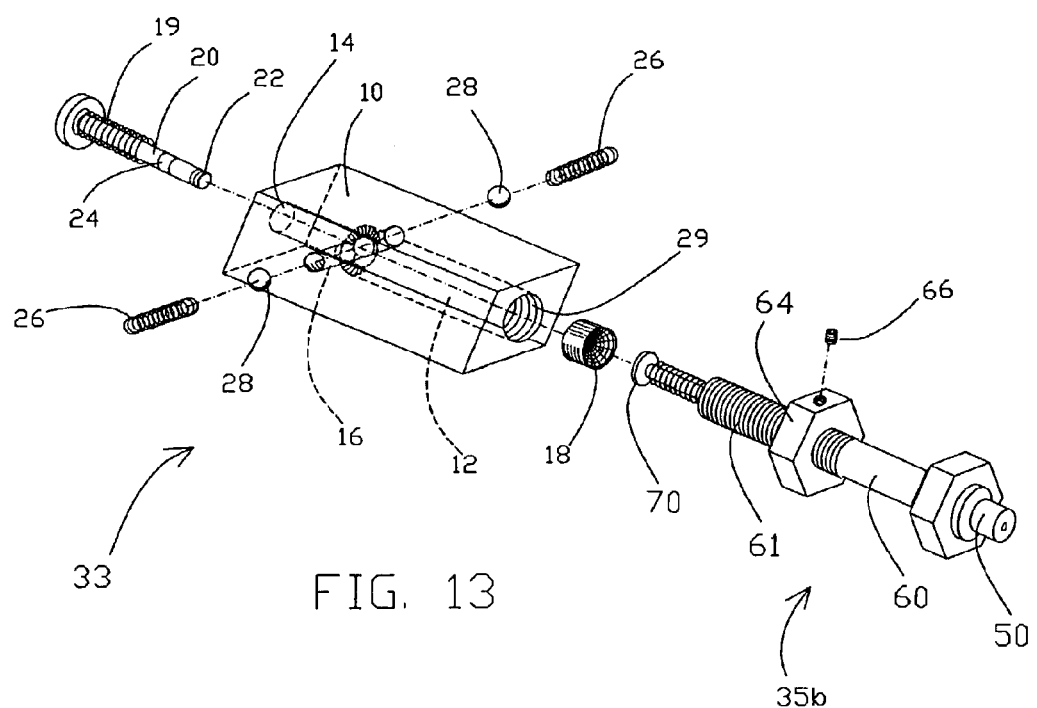
FIG. 13 shows an exploded perspective view of the spotlight control mechanism relative to the type B sync screw.

The purpose of the sync screw type-B 35B is the same as the sync screw type-A 35A, namely, to cause the camera shutter to be released. The sync screw type-B 35B can be used for cameras that have an electronic shutter release. FIG. 13 shows an exploded perspective view of the spotlight control module 33 and the sync screw type-B 35B. FIG. 17 shows an assembled plan view of the spotlight control module 33 and the sync screw type-B 35B. FIG. 17 also shows that when the photographer presses the nylon trigger 20, the sync screw type-B trigger 70 makes physical contact with the nylon trigger 20. FIG. 5 shows an exploded perspective view of the sync screw type-B 35B. FIG. 6 shows the assembled internal structure of the sync screw type-B 35B. When the sync screw type-B trigger 70 is pressed by the nylon trigger 20, a piston 56 and a copper plate 54 are pushed into contact with a terminal contact post 46 and an idle spring 38. Contact between the copper contact plate 54 and the terminal contact post 46 and the idle spring 38 completes a circuit. FIG. 4A, 4B and 4C shows that terminal contact post 46 and idle spring 38 are extensions of a terminal contact-1 44 and a terminal contact-2 45 of the female phono plug 50. These aforementioned components comprise a momentary switching mechanism.

Operation of the Toggle Override Switch 97

The purpose of the toggle override switch 97 is to allow the photographer to turn on the spotlight in a way that frees up both hands. This is useful when the photographer wants to make adjustments to the flash bracket arm 120 while the spotlight is on.

Synchronizing the Spotlight Control Module to the Camera Shutter Using a Sync Screw Type-A 35A.

The Flash Bracket with Synchronized Spotlight system FIG. 18, can be used hand held or mounted to a tripod using commercially available baseplates (not shown). To begin using this flash bracket, the user must synchronize the spotlight 121 to the camera shutter. This means that the spotlight 121 must be adjusted to turn itself off just before the camera shutter is released. One may begin by mounting a camera that has no film in it onto the flash bracket base with a tripod screw (not shown). The rest of the procedure is best done with the flash bracket mounted onto a tripod support. If no tripod is available, the flash bracket with camera can be set on a chair. Then one points the camera at a wall from a distance of about 3 meters. The power supply is connected to the flash bracket by plugging one end of the input power cord 117 into the female input power plug 115 and the other end into a battery pack 30 FIG. 34. One now turns on the spotlight 121 with the toggle override switch 97 and adjusts the flash bracket arm 120 until the spotlight beam on the wall is centered and focused in the camera viewfinder. One should now turn the spotlight off with the toggle override switch 97. Next, a cable release, as shown in FIG. 11 is loaded into a sync screw type-A 35A, as shown in FIG. 10 and FIG. 8. A sync screw lock nut 64 should already be threaded onto the sync screw type-A 35A until it reaches the non-threaded portion of the shaft. The sync screw type-A 35A is then ready to be inserted into the spotlight control module 33.

FIG. 20 shows a side view of the spotlight control module with sync screw 31 when the sync screw type-A 35A is correctly in place. The cable release stem 72 must be seated into the cable release coupler 18. The cable release coupler 18 is designed with a funnel shaped coupling recess 21 so that the cable release stem 72 will self-seat into the cable release coupler 18. Some cable releases have a cable release plunger cap 76 that is small enough to fit into the funnel shaped coupler recess 21 of the cable release coupler 18. In such cases, the cable release can be used as is with the cable release plunger cap 76 intact, and self-seating will still be assured.

Making Sync Screw Rough Adjustments

To begin making sync screw adjustments, one must turn the sync screw type-A 35A clockwise until the cable release plunger 77 FIG. 11, appears from the end of the 500 mm cable release cord 69. Next, one must back the sync screw type-A 35A off until the cable release plunger 77 only just recedes completely back into the cable release sheath. Then one must connect the cable release to the camera shutter release button 37. Next one must press the nylon trigger 20 until the spotlight comes on. While watching the spotlight beam on the wall, one must continue to press the nylon trigger 20 until the camera shutter is released. If the spotlight turned off too much in advance of the shutter release, one must screw the sync screw type-A 35A clockwise and repeat the procedure. Eventually, the spotlight will appear to go off at about the same time that the camera shutter is released.

Making Sync Screw Fine Adjustments

To do a finer adjustment, one should open up the camera back so that the shutter curtain is in full view. The rest of the procedure should be performed in a darkened room. While looking at the shutter curtain, fire the camera shutter by pressing the nylon trigger20. If the light from the spotlight, reflected from the wall, appears in the shutter curtain area when the shutter is released, rotate the sync screw type-A 35A counterclockwise and repeat. Moving the sync screw type-A 35A clockwise makes the spotlight shut off nearer to when the shutter is released, while a counter clockwise rotation of sync screw type-A 35 A makes the spotlight go off early relative to the shutter release. In this way the camera can be synchronized with the spotlight. Once the synchronization is completed, the sync screw lock nut 64 should be rotated till it butts up against the acrylic spotlight control module housing 10, and the setscrew 66 can be screwed down to permanently hold the sync screw lock nut 64 in position on the sync screw type-A 35 A. The sync screw type-A 35A can be removed from the spotlight control module 33 for storage or travel, and re-inserted without performing the synchronization task since the sync screw lock nut 64 will prevent the sync screw type-A 35A from being inserted past the synchronization position in control module 33.

Synchronizing the Spotlight Control Module to the Camera Shutter Using a Sync Screw Type-B 35B.

The sync screw type-B 35B FIG. 9, is for use with cameras that require an electronic cable release. For the first step, plug the male phono plug 51 of the electronic shutter release cord 71 into the female phono plug 50 of the sync screw type-B 35B. Next, connect the other end of the electronic shutter release cord 71 to the camera shutter release input port. Since camera designs will vary, the ways to attach the electronic shutter release cord 71 to the camera will vary so this aspect of making the connection is not shown. Depending upon the camera's manufacturer, the appropriate connector piece will be spliced to the electronic shutter release cord 71. From this point onward the process for synchronizing the sync screw type-B 35B with a camera shutter is the same as that which is followed for the sync screw type-A 35A.

Using the Flash Bracket in the Field

The Flash Bracket with Synchronized Spotlight system FIG. 18, can be used hand held or mounted to a tripod using commercially available baseplates (not shown). The user must plug an input power cord 117 into the female input power plug 115 located just below the pistol grip handle 91. The other end of the input power cord 117 must be plugged into a battery pack 30 FIG. 34, or into a flashlight that has been fitted with a female phone plug 50. The latter is preferred since the photographer will already be carrying a flashlight during any night excursion into the field. The flashlight may be held in a vest pocket or waist pouch in order to free up the hands. When the photographer finds a subject to photograph, adjustments must be made to the flash bracket arm 120 so that the flash unit 122 and the spotlight 121 are positioned to the photographer's satisfaction. This adjustment to the flash bracket arm 120 is easily done by first turning on the spotlight by the toggle override switch 97, and then adjusting the flash bracket arm 120 so that the spotlight beam is hitting the subject as the photographer peers through the camera viewfinder. Since the spotlight 121 and the flash unit 122 are mounted on the same flash bracket arm 120, the flash unit 122 will be simultaneously pointed towards the subject along with the spotlight. Flash unit 122 reflectors are designed to cast light over a broad area, so the flash unit 122 needs only to be pointed in the general direction to be accurate. The spotlight will tend to produce a more directed beam of light, for this reason, the spotlight requires more effort to point towards a subject. Mounting the spotlight 121 to the flash bracket arm 120 by way of an elbow pivot 136 will reduce the effort it takes to aim the spotlight. This arrangement allows the user to make fine adjustments to the spotlight, while avoiding additional adjustments to the flash unit 122, since as already mentioned, the accuracy of flash orientation is less affected by minor changes made to direction. For example, lets say the photographer has made all the necessary adjustments to get the spotlight perfectly centered on a subject. Then lets say the photographer decides to step away from the subject to change the composition. The photographer will need to tilt the spotlight up slightly (compensate for parallax) to keep the light on the subject. The elbow pivot 136 makes this easy to do.

Ramifications

It is possible to go without use of an elbow pivot 136 when the spotlight is mounted directly onto the flash bracket arm 120. The tension on the ball joint 79 can be set light enough to allow the flash bracket arm 120 to be moved by one hand into a position that will be maintained without further tension adjustment to the ball joint knob. This will require the use of a small, lightweight flash unit 122, which is the preferred type of flash unit for this system. This also serves to demonstrate why it is important to keep the excess weight of batteries off of the flash bracket arm 120. Some cable releases FIG. 11, may need to be modified before being used with the spotlight control module 33. This is because some cable releases have a plunger cap that is not small enough to fit into the sync screw channel 12 FIG. 12, or the recess 21 of the cable release coupler 18. The solution to this problem is to remove the plunger cap, leaving only the stem. However, cable releases with appropriately sized plunger caps have been found to be readily available.

A Second Preferred Embodiment of the Spotlight Control Module with Sync Screw

DETAILED DESCRIPTION FIGS. 24 to 30

Figure 24:
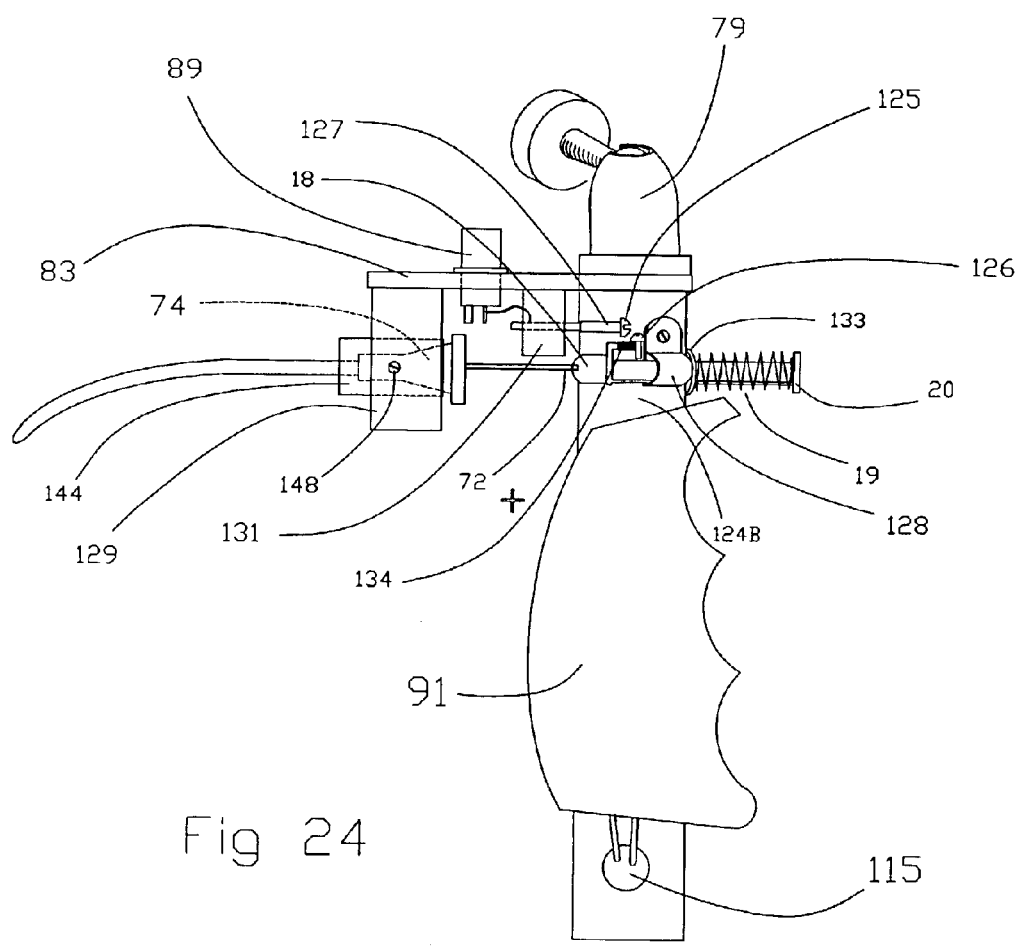
FIG. 24 shows an alternate ramification of a side view of the spotlight control mechanism mounted to the flash bracket.
Figure 25:
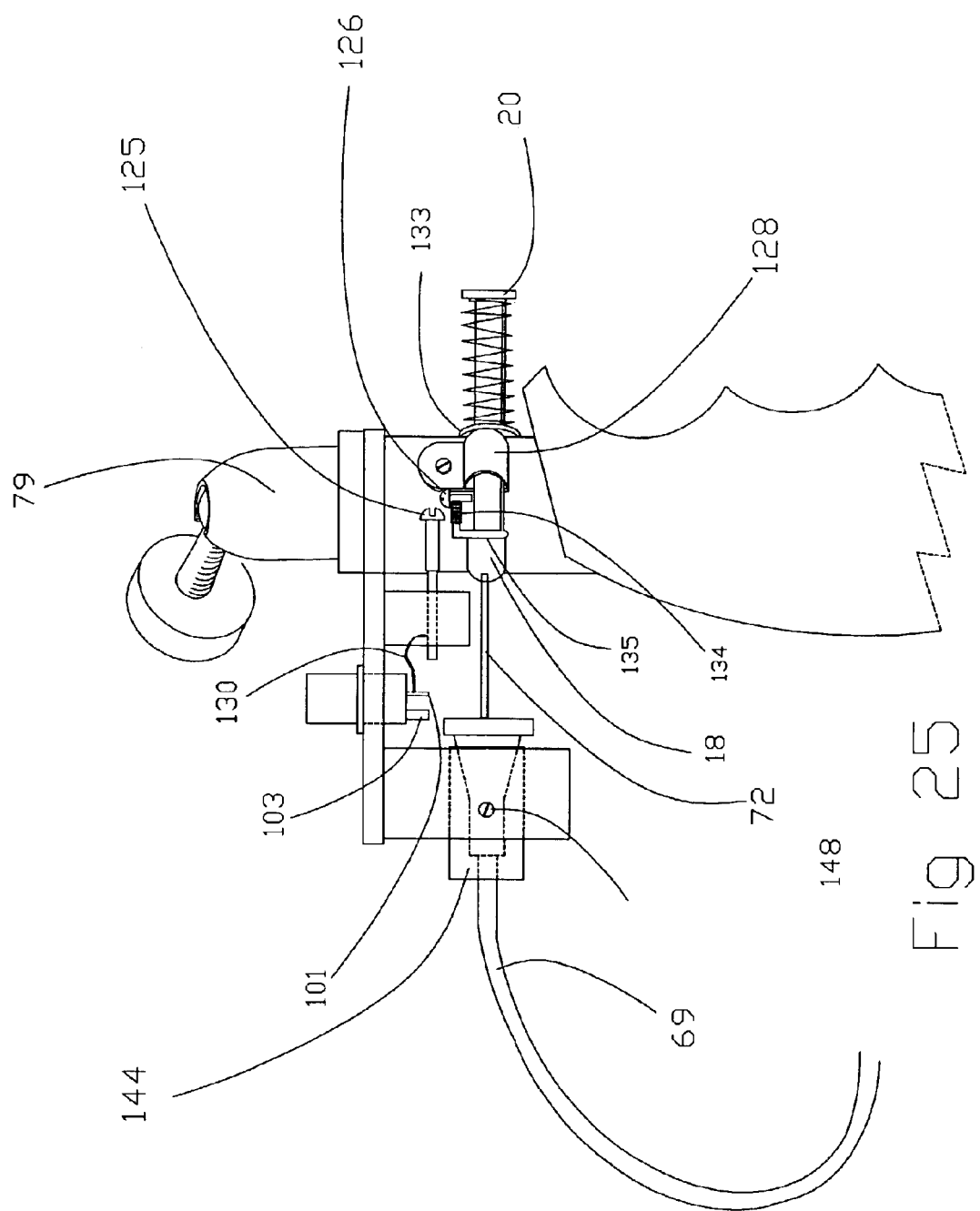
FIG. 25 shows an enlarged side view of the detail of the alternate ramification of the spotlight control mechanism mounted to the flash bracket.
Figure 26:
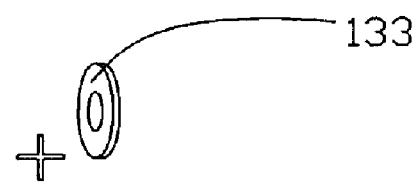
FIG. 26 shows a copper washer used to make an electrical connection with the alternate ramification of the spotlight control mechanism.

Referring to FIG. 24, another embodiment of the present invention is shown. The nylon trigger 20 is mounted to the flash bracket riser 124B with a 6.4 mm nylon cable clamp 128. FIG. 25 shows an enlarged view of FIG. 24. A contact arm 135 is attached to the nylon trigger 20 and makes electrical contact with the spotlight trigger return spring 19 and a copper washer contact 133. The copper washer contact 133 of FIG. 26 is pressed into contact with the metal of the flash bracket riser 124B to make a ground connection. The toggle override switch 97 and female spotlight phono plug 89 are not shown in FIG. 24 because they are the same as shown in FIG. 21. A wire connection (not shown) is made from the alternate post 107 of the toggle override switch 97 to ground and from the center post 105 of the toggle override switch 97 to a positive terminal post 101 of the female spotlight phono plug 89. As in the first preferred embodiment, a negative lead wire 95 emerges near the top of the pistol grip handle 91 and discreetly makes a path (not shown) to negative terminal post 103 of the female spotlight phono plug 89.

Figure 29:
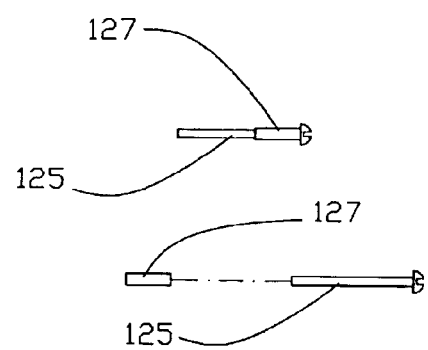
FIG. 29 shows a side view of the assembly of a screw with insulator as needed by the alternate ramification of the spotlight control mechanism.

FIG. 24 shows a trigger screw contact 126 is attached to the contact arm 135 with a flex spring 134. A sync screw contact 125 is mounted to the mounting plate 83 using a mounting block 131. The sync screw contact 125 wears an insulator 127 for part of its length, as shown in FIG. 29. The sync screw contact 125 makes electrical contact with the positive terminal post 101 by way of a lead wire 130. FIG. 25 shows the cable release head 74 of a cable release with the cable release stem 72 coupled with the cable release coupler 18.

Figure 27:
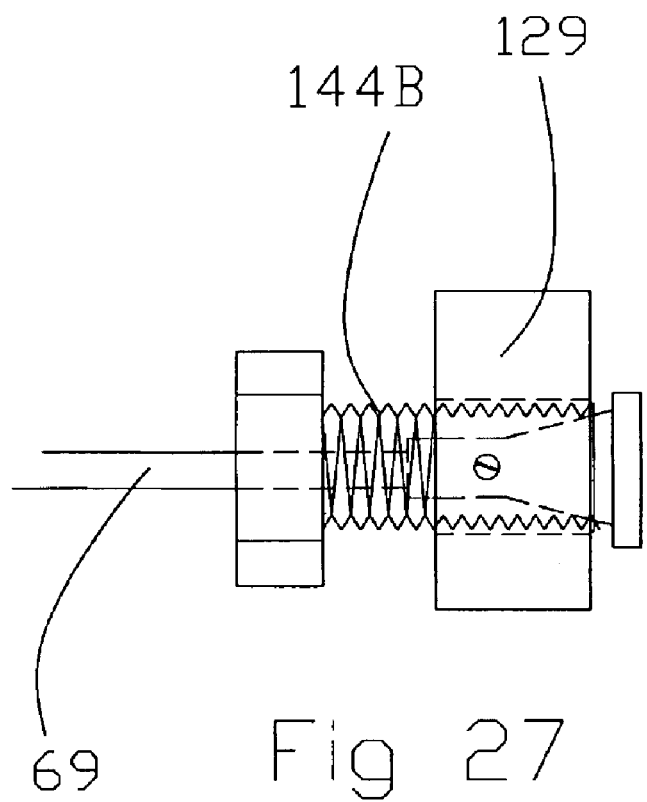
FIG. 27 shows a first preferred embodiment of the sync collar with cable release.
Figure 28:
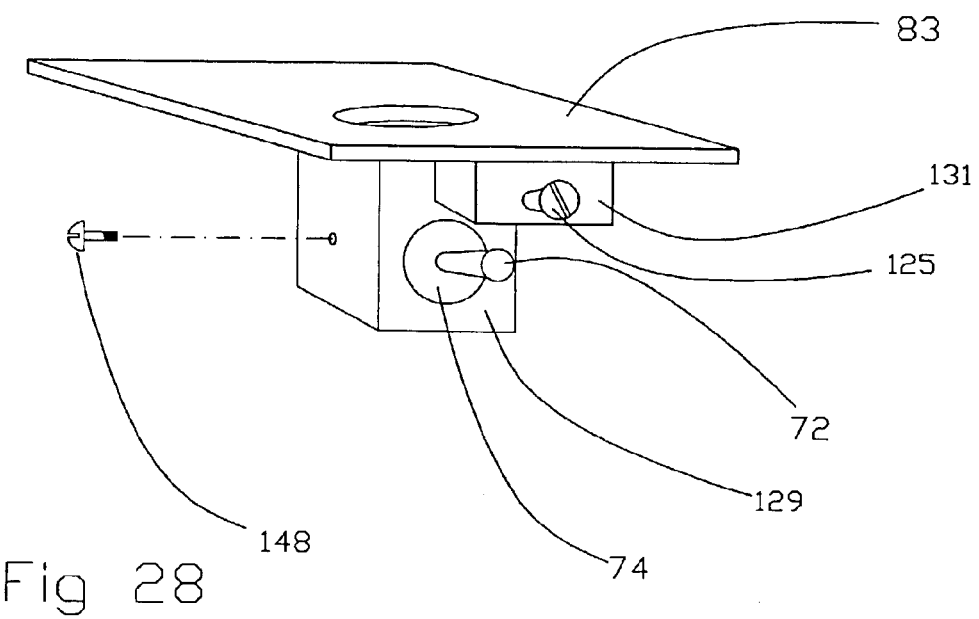
FIG. 28 shows a perspective view of the mounting platform with an alternate ramification of the spotlight control mechanism.
Figure 30:
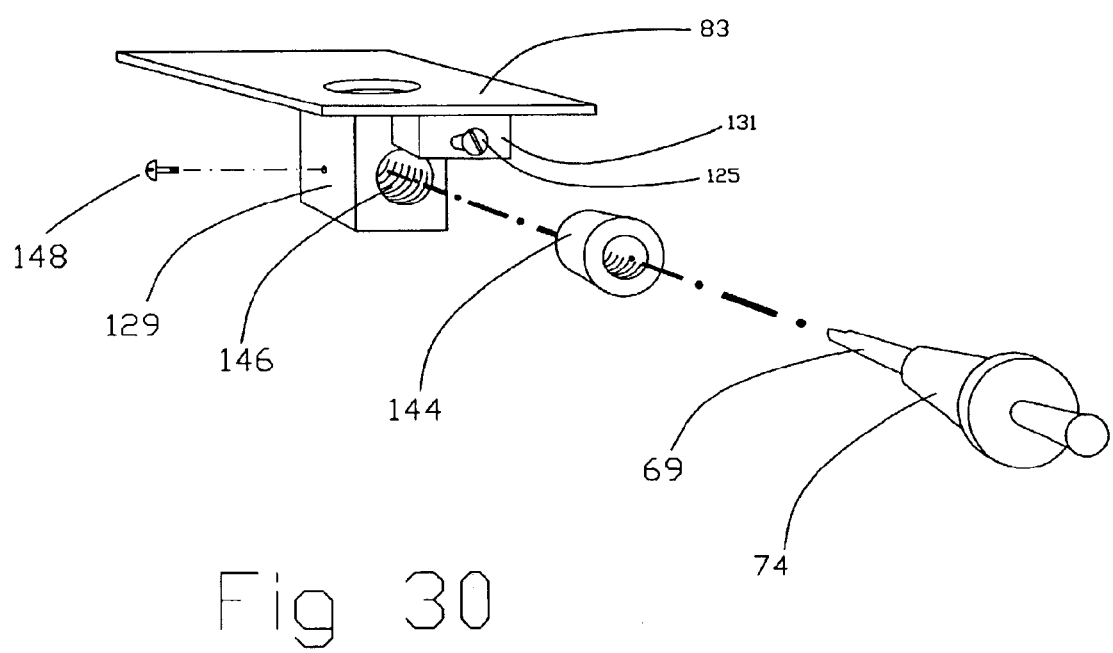
FIG. 30 shows an alternate embodiment of the sync collar with cable release.

FIG. 28 shows a perspective view of the mounting block 129 and the mounting block 131. FIG. 30 shows that the 500 mm cable release cord 69 of the cable release head 74 is passed through a sync collar 144. The sync collar 144 is then inserted into a sync collar channel 146 of a mounting block 129 to mount all of the latter to the mounting plate 83. FIG. 27 shows how a sync collar screw 144*b*, which is an alternate design for the sync collar 144, can be screwed into the sync collar channel 146 if the sync collar channel 146 is designed with internal threads. The mentioned parts in this second preferred embodiment effectively replace the functionality of the spotlight control module with sync screw 31 of the first preferred embodiment. All other parts and connections are the same as those shown and described in the first preferred embodiment.

Operation FIGS. 24 to 30
Operation of a Second Preferred Embodiment of the Spotlight Control Module with Sync Screw FIG. 24 shows an assembled plan view of the spotlight control mechanism. The drawing shows that the nylon trigger 20, when pressed by the photographer, will engage the cable release stem 72 of a cable release, which is seated within the mounting block 129.

The drawing further shows that the trigger screw contact 126 will make contact with the sync screw contact 125 as a result of pressing the nylon trigger 20. A circuit is completed when contact is made between the trigger screw contact 126 and the sync screw contact 125 thus the spotlight 121 will be turned on. As the nylon trigger 20 is pressed further, the trigger screw contact 126 will move off of the sync screw contact 125 and make contact with the insulator 127 and break the circuit, turning off the spotlight 121. At the instant that the spotlight 121 is turned off the camera shutter is released by the continued pushing action between the cable release coupler 18 and the cable release stem 72. Thus the single action of pressing the nylon trigger 20 will perform three tasks:

The spotlight is turned on.
The spotlight is turned off.
The camera shutter is released just as the spotlight is turned off.

When the photographer releases pressure on the nylon trigger 20, the spotlight trigger return spring 19 will return the nylon trigger 20 back to an idle position. The positioning of the sync screw contact 125 within the mounting block 131 performs synchronization of the spotlight 121 with the camera shutter. When the sync screw contact 125 is moved forward into the mounting block 131, the point at which the spotlight 121 will turn off will approach the point in time when the camera shutter is released. When the sync screw contact 125 is moved back out of the mounting block 131, the spotlight 121 will turn off earlier relative to the firing of the camera shutter. The task of positioning the sync screw contact 125 within the mounting block 131 is performed by rotating the sync screw contact 125 clockwise to go forward into the mounting block or counterclockwise to go backward, using a small screwdriver (not shown).

Making Sync Screw Rough Adjustments with the Second Preferred Embodiment

To begin making sync screw adjustments, one must push the sync collar 144 FIG. 30, forward within its mounting block 129 towards the cable release coupler 18 until the cable release plunger 77 FIG. 11, appears from the end of the 500 mm cable release cord 69. FIG. 27 shows an alternate design where the sync collar 144B is threaded, so it can be rotated as a screw, to cause it to move forward with better control. Next, one must back the sync collar 144 off until the cable release plunger 77 recedes completely back into the cable release sheath. One must then lock the sync collar 144 within the sync collar channel 146 by screwing the sync collar set screw 148 into the mounting block 129. Then one must connect the cable release to the camera shutter button 37. Next one must press the nylon trigger 20 until the spotlight comes on. While watching the spotlight beam on the wall, one must continue to press the nylon trigger 20 until the camera shutter is released. If the spotlight went off too much in advance of the shutter release, one must screw the sync screw contact 125 clockwise and repeat the procedure. Eventually, the spotlight will appear to go off at about the same time that the camera shutter is released. This procedure has been a rough adjustment. To do a finer adjustment, one should open up the camera back so that the shutter curtain is in full view. The rest of the procedure should be performed in a darkened room. While looking at the shutter curtain, fire the camera shutter by pressing the nylon trigger 20. If the light from the spotlight, reflected from the wall, appears in the shutter curtain area when the shutter is released, rotate the sync screw contact 125 counterclockwise and try again. Moving the sync screw contact 125 clockwise makes the spotlight shut off nearer to the time that the shutter is released, while a counter clockwise rotation of sync screw contact 125 makes the spotlight go off early relative to the shutter release. In this way the camera is synchronized with the spotlight.

Summary, Ramifications, and Scope

Accordingly, the reader will see that the Flash Bracket with Synchronized Spotlight system of this invention provides an excellent solution to the problem of working in poor lighting situations. Other applications for this invention may be found than those already noted. For example, it may be possible to eliminate the well known problem of "red eye" using this invention. This system is of rugged design and ideal for work in remote field locations or in a studio setting. The Flash Bracket with Synchronized Spotlight system provides the nature photographer with a versatile, portable lighting system that is lightweight;
provides a spotlight that can be readily aimed at the subject to be photographed;
provides a spotlight that can use 3 D-size batteries, but does not carry the battery weight on the flash bracket frame;
provides a spotlight that is not limited in range to only close-up photography;
provides a spotlight that will produce light only when the photographer needs it, thus conserving power;
provides a spotlight that will not frighten away the subject to be photographed;
provides a spotlight that will work with old or new camera systems;
provides a spotlight that allows the photographer to work alone unhurried; and
provides a spotlight that will not ruin the photograph by causing a "ghosting" effect to be produced in the final image.

Finally it should be noted that the sync screw type-B 35B has some advantages over the sync screw type-A 35A. The sync screw type-A 35A must be used in combination with a cable release. Cable releases are fairly delicate instruments that can be damaged by being kinked or pulled apart. Such damage tends to occur while the cable release is in use, which can result in the termination of the work session. One solution is to have several cable release replacements on hand. A second solution is available for camera models that use an electrically operated shutter release that can be triggered by a push button switch and a length of electrical cord. For these camera models, the sync screw type-B 3513 uses a phono plug adapted cord 71 of FIG. 9 to connect back to the camera's shutter release. The electrical cord 71 is inherently more flexible than a cable release, and will not be bothered by being kinked. This cord can be more easily tied out of the way while in use. Furthermore, the cord can be unplugged from the sync screw type-B 35B for easy storage or transport of the bracket without the need to remove the sync screw type-B 35B from the control module 33. In contrast, the sync screw type-A 35A must be removed from the control module 33 as a transport precaution to avoid possible damage to the cable release.

While the above descriptions contain many specificities, the reader should not construe these as limitations on the scope of this invention, but merely as exemplifications of preferred embodiments thereof. Those skilled in the art will envision many other possible variations which are within its scope. For example, although I have said that AA size batteries are inadequate power sources when used with prior art spotlights, such is not the case with my invention. As explained earlier, this invention does not wear out batteries quickly as does the prior art, therefore fresh AA size batteries can retain a state of full power longer. The small size of AA batteries also will permit their placement on the bracket in such places as under the pistol grip handle. In this way, it may be possible to eliminate the battery pack 30. One skilled in the art may also find a way to replace the built-in momentary switch 52 with a commercially available micro momentary switch. Also, the modular design of the spotlight control module 33 could be used to make this item a "snap on, snap off" piece. Such a design can improve storage and portability of the invention. Furthermore, the spotlight control module 33 may also be designed in such a way as to make it behave as a "snap on" accessory for use with other photographic systems. Additionally, it is possible to improve the spotlight portion of this invention by placing a red filter over the lens. Many nocturnal animals are less bothered by red light than full spectrum light. Finally, the adjustable nature of the synchronization feature of this invention will provide the user with a demonstration that proves that the spotlight will not adversely affect the photographic results. Accordingly, the reader is requested to determine the scope of the invention by the appended claims and their legal equivalents and not by the examples that have been given.

I claim:

1. A focusing light controller for use in combination with a camera, a spotlight and a flash bracket, said focusing light controller is capable of being used as a snap on accessory and comprises:
   a switching means for deactivating said spotlight approximately simultaneously as the shutter of said camera is opened such that said spotlight can be used effectively with a variety of light sources and
   a synchronization trigger that is partially depressed so that said synchronization trigger serves as said switching means to activate, said spotlight during the period that the camera shutter is closed and deactivates said spotlight approximately simultaneously as the shutter of said camera is opened when said synchronization trigger is fully depressed thereby resulting in on/off synchronization between said spotlight and said camera shutter and
   a synchronization means that employs an adjustable calibration means for controllably coupling said synchronization trigger with a camera shutter release, such that said synchronization means can be adjustably calibrated by a layperson to accomplish said on/off synchronization between a camera shutter and said spotlight in such a way that all variances due to light source choice are accounted for during said calibration adjustment process by said layperson whereby a bright spotlight can not contaminate the photograph and photography is made convenient under poor lighting conditions.

2. The focusing light controller as defined in claim 1, wherein said synchronization trigger and said synchronization means does not rely upon signals from said camera to enable said on/off synchronization between said camera shutter and said spotlight.

3. The focusing light controller as defined in claim 1, wherein said synchronization trigger and said synchronization means are encased in a shell as a coherent unit and collectively serve as a control module for said spotlight.

4. The focusing light controller as defined in claim 3, wherein said control module and said synchronization trigger are to be operated to cause said synchronization trigger to travel through a channel in said control module until substantial contact is made between said synchronization trigger and a camera shutter release means within said channel.

5. The focusing light controller as defined in claim 4, wherein said on/off synchronization of said spotlight depends upon the position of said synchronization trigger within said channel of said control module.

6. The focusing light controller as defined in claim 3, wherein said control module ensures said spotlight will be off immediately prior to said camera's shutter being released when said synchronization trigger is fully depressed.

7. The focusing light controller as defined in claim 4, further includes a manually adjustable element of said control module whereby said on/off synchronization of said spotlight with said camera shutter is achieved and whereby termination of said spotlight activity coincides with the release of said camera shutter as a result of the motion of said synchronization trigger.

8. The focusing light controller as defined in claim 7, wherein said channel is threaded and said threaded channel is threadedly mated with said adjustable element wherein said adjustable element is a threaded sync screw.

9. The focusing light controller as defined in claim 8, wherein said sync screw is elongated and has a longitudinal through-hole.

10. The focusing light controller as defined in claim 9, wherein a cable release is inserted into said longitudinal through-hole and wherein said cable release communicates with said synchronization trigger and said camera shutter release.

11. The focusing light controller defined in claim 8, wherein said sync screw houses a momentary switch and said momentary switch communicates with said synchronization trigger, further including an electronic shutter release cord which communicates with said momentary switch and said camera shutter release.

12. A focusing light controller that can be installed as an accessory component when used in combination with a camera a spotlight and a flash bracket, said focusing light controller comprises:
   a synchronization means that employs an adjustable calibration means that a layperson can adjustably calibrate thereby resulting in on/off synchronization between said spotlight and a camera shutter for the purpose of preventing any exposure contribution by said spotlight to a resulting image of a subject being photographed whereby said spotlight may use a variety of light sources effectively as a focusing light and
   an actuating means, used in combination with said synchronization means for controlling said on/off synchronization of said spotlight whereby photography is made convenient under poor lighting conditions.

13. The focusing light controller as defined in claim 12, is housed within a an electrically non-conductive material and collectively serve as a control module for said spotlight.

14. The focusing light controller as defined in claim 13, wherein said actuating means is a synchronization trigger and wherein said synchronization trigger is to be operated to travel through a channel in said electrically non-conductive material until substantial contact is made between said synchronization trigger and a camera shutter release means within said channel.

15. The focusing light controller as defined in claim 14, wherein electric power for said spotlight depends upon the partial depression of said synchronization trigger and wherein full depression of said synchronization trigger results in the release of said camera shutter approximately simultaneously as said spotlight is deactivated thereby resulting in said on/off synchronization between said spotlight and said camera shutter.

16. The focusing light controller as defined in claim 14, further includes an adjustable element of said control module whereby said on/off synchronization of said spotlight with said camera shutter is achieved and whereby termination of said spotlight activity coincides with the release of said camera shutter as a result of the motion of said synchronization trigger.

17. The focusing light controller as defined in claim 16, wherein said channel is threaded and said threaded channel is threadedly mated with said adjustable element and wherein said adjustable element is a threaded sync screw.

18. The focusing light controller as defined in claim 17, wherein the position of said sync screw in said threaded channel determines said on/off synchronization between said camera shutter and said spotlight.

19. The focusing light controller as defined in claim 18, wherein said sync screw is elongated and has a longitudinal through-hole.

20. The focusing light controller as defined in claim 19, further including a cable release inserted into said longitudinal through-hole wherein said cable release communicates with said synchronization trigger and said camera shutter.

21. The focusing light controller as defined in claim 17, wherein said sync screw houses a momentary switch and said momentary switch communicates with said synchronization trigger, further including a signal conveyance means which communicates with said momentary switch and said camera shutter.

* * * * *